US012779322B2

(12) United States Patent
Guinchard et al.

(10) Patent No.: US 12,779,322 B2
(45) Date of Patent: Nov. 3, 2026

(54) GUITAR VIDEOGAME CONTROLLERS HAVING HALL EFFECT BUTTONS AND ACTUATORS

(71) Applicant: Embracer Freemode Inc., Livermore, CA (US)

(72) Inventors: Lee Guinchard, Livermore, CA (US); Jared Chan, Tsuen Wan (HK)

(73) Assignee: Embracer Freemode Inc., Livermore, CA (US)

( * ) Notice: Subject to any disclaimer, the term of this patent is extended or adjusted under 35 U.S.C. 154(b) by 0 days.

(21) Appl. No.: 19/287,617

(22) Filed: Jul. 31, 2025

(65) Prior Publication Data

US 2026/0124528 A1 May 7, 2026

Related U.S. Application Data

(60) Provisional application No. 63/717,186, filed on Nov. 6, 2024.

(51) Int. Cl.
*A63F 13/245* (2014.01)
*A63F 13/814* (2014.01)

(52) U.S. Cl.
CPC .......... *A63F 13/245* (2014.09); *A63F 13/814* (2014.09)

(58) Field of Classification Search
CPC ............................ A63F 13/245; A63F 13/814
USPC ............................................................ 463/37
See application file for complete search history.

(56) References Cited

U.S. PATENT DOCUMENTS 7,973,234 B1 * 7/2011 Yang ....................... A63F 13/23 446/408
9,082,384 B1 7/2015 Cohen
2009/0088250 A1 * 4/2009 Carlson ................. A63F 13/213 463/37
2009/0260508 A1 10/2009 Elion
2015/0363014 A1 * 12/2015 Wang .................. G06F 3/03548 345/157
2022/0093066 A1 * 3/2022 Savage .................. G10H 3/143

FOREIGN PATENT DOCUMENTS

EP 125145 A1 11/1984
WO WO2009018270 A1 2/2009

* cited by examiner

*Primary Examiner* — Michael C Grant
(74) *Attorney, Agent, or Firm* — Kolitch Romano Dascenzo Gates LLP

(57) ABSTRACT

A guitar videogame controller in accordance with the present disclosure may be configured to be utilized to play videogames that involve simulating the playing of a guitar, such as Guitar Hero®, Rock Band®, Fortnite Festival®, etc. The guitar videogame controller includes one or more hall effect buttons that are configured to facilitate a user setting a desired trigger point for the hall effect button, e.g., to what extent the user is required to actuate or move (e.g., rotate or linearly translate) the hall effect button, in order for the controller to register actuation of the button. For example, the guitar videogame controller may include a hall-effect whammy bar, hall-effect strum bar, and/or one or more hall-effect fret buttons.

18 Claims, 14 Drawing Sheets

GUITAR VIDEOGAME CONTROLLERS HAVING HALL EFFECT BUTTONS AND ACTUATORS

CROSS-REFERENCES

The following applications and materials are incorporated herein by reference, in their entireties, for all purposes: U.S. Provisional Patent Application Ser. No. 63/717,186, filed Nov. 6, 2024.

FIELD

This disclosure relates to systems and methods for videogame controllers. More specifically, the disclosed embodiments relate to guitar videogame controllers.

INTRODUCTION

Many music-based videogames exist which simulate playing a musical instrument for a user, such as Guitar Hero®, Rock Band®, and Fortnite Festival®. Some such music-based videogames have corresponding controllers which are designed similarly to the musical instruments that are simulated in the gameplay, such as guitars, drums, microphones, etc.

SUMMARY

The present disclosure provides systems, apparatuses, and methods relating to guitar videogame controllers for music-based videogames.

In some examples, a guitar videogame controller comprises: a housing including a housing body, an elongate neck extending outward from the housing body, and a fretboard disposed on the elongate neck; a hall effect button operatively coupled to the housing and configured to be selectively moved relative to the housing to actuate the hall effect button, wherein the hall effect button includes a magnet; a hall effect sensor fixed relative to the housing, wherein the hall effect sensor is configured to detect a magnitude of a magnetic field of the magnet at the hall effect sensor and to generate an output signal indicating the magnitude of the magnetic field; and a controller including processing logic configured to register when the hall effect button is actuated based on the output signal and to output one or more control signals to a videogame console indicating actuation of the hall effect button.

In some examples, a guitar videogame controller comprises: a housing including a housing body, an elongate neck extending outward from the housing body, and a fretboard disposed on the elongate neck; a hall effect button supported by the housing, the hall effect button including: a button body configured to be selectively moved relative to the housing to actuate the hall effect button; a magnet operatively coupled to the button body, such that the magnet is configured to be selectively moved relative to the housing with the button body; and a hall effect sensor fixed relative to the housing, wherein the hall effect sensor is configured to detect a component of a magnetic field of the magnet and to generate an output signal indicating a magnitude of the component of the magnetic field; and a controller including processing logic configured to register actuation of the hall effect button based on the output signal, wherein the processing logic is configured to output one or more control signals to a videogame console indicating actuation of the hall effect button in response to registering actuation of the hall effect button.

Features, functions, and advantages may be achieved independently in various embodiments of the present disclosure, or may be combined in yet other embodiments, further details of which can be seen with reference to the following description and drawings.

DETAILED DESCRIPTION

Figure 1:
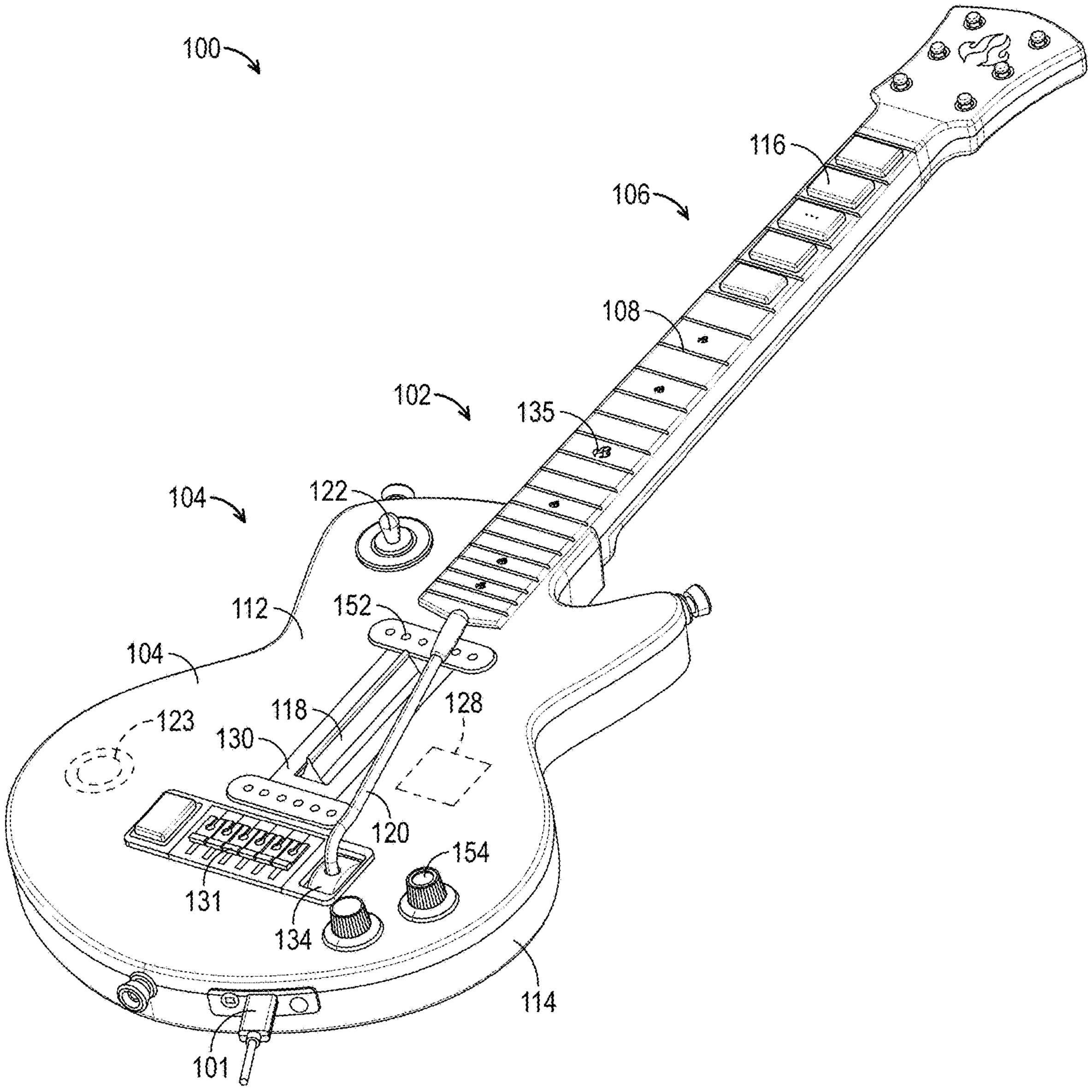
FIG. 1 is a front isometric view of an illustrative guitar videogame controller in accordance with aspects of the present disclosure.

Various aspects and examples of a guitar videogame controller having one or more hall effect buttons and/or actuators, as well as related methods, are described below and illustrated in the associated drawings. Unless otherwise specified, a guitar videogame controller in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Rigid" describes a material or structure configured to be stiff, non-deformable, or substantially lacking in flexibility under normal operating conditions.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a guitar videogame controller in accordance with the present teachings may include one or more hall effect buttons or actuators, each of which includes a hall effect sensor and a magnet. The magnet is positioned on an actuatable body of the button and the hall effect sensor is configured to detect movement (e.g., rotation and/or translation) of the magnet relative to the hall effect sensor. The guitar videogame controller is configured to determine whether the hall effect button has been actuated or not and/or to what extent the hall effect button has been actuated based on the magnetic field detected by the hall effect sensor at any given time. The hall effect buttons or actuators facilitate a user setting one or more preferred trigger points for each of the hall effect buttons, e.g., to what extent the user is required to actuate or move (e.g., rotate or linearly translate) the button, and therefore the magnet coupled to the button, in order for the controller to register actuation of the button. This results in the guitar videogame controller being customizable, e.g., according to the user's preferences, and an improved gaming experience for the user. The guitar videogame controller is configured to be operatively connected to a gaming console (e.g., a Nintendo Switch, PC, PS3, PS4, etc.), e.g., via a wired or wireless connection with the videogame console. The guitar videogame controllers according to the present disclosure are configured to be utilized to play videogames that involve simulating the playing of a guitar, such as Guitar Hero®, Rock Band®, Fortnite Festival®, etc.

Guitar videogame controllers disclosed herein may include one or more of the following:

- A housing that is shaped similarly to a conventional guitar and that is configured to support and/or house the other components of the guitar videogame controller, e.g., internal electronic components and buttons.
- One or more digital buttons, such as a directional pad
- One or more analog touchpads or analog sticks
- One or more hall effect buttons (e.g., a hall effect whammy bar, hall effect strum bar, and/or hall effect fret buttons) that include a magnet attached to an actuatable button body and a hall effect sensor that is configured to detect movement (e.g., rotation or linear translation) of the actuatable button body based on a magnetic field at the hall effect sensor.
    - The hall effect sensor is configured to generate and output an output signal (e.g., an analog voltage signal or pulse-width modulation (PWM) signal) that is proportional to the strength of the magnetic field at the hall effect sensor.
    - The output analog voltage signal or pulse-width modulation (PWM) signal is utilized by the guitar videogame controller to determine actuation of the hall effect button.

- The one or more hall effect buttons permit a user to set their preferred trigger point for the button, e.g., to what extent the user is required to actuate or move the button in order for the controller to register actuation of the button and output corresponding control signals to the videogame console.
- The hall effect buttons permit the user to customize the guitar videogame controller according to their preferences by setting their preferred trigger point for each of the hall effect buttons.

A control system that is configured to analyze the information detected by the hall effect sensor of the hall effect buttons and to determine one or more corresponding control signals to transmit to the videogame console.

- For example, based on the magnitude of the magnetic field detected by the hall effect sensor, the control system may determine when the user has actuated the hall effect button and transmit a corresponding control signal to the videogame console.

A wired connection (e.g., a USB-C connector) and/or wireless connection (e.g., 2.4 GHz wireless connection) with a videogame console, e.g., Nintendo Switch®, PC, Xbox® Series X or S, PlayStation® 3, 4, or 5, etc.

- The guitar videogame controller is configured to selectively transmit and/or receive control signals from the videogame console via the wired connection and/or the wireless connection with the videogame console.
- The guitar videogame controller is configured to operate in one or more different connection modes with the videogame console:
  - Dongle mode
    - In dongle mode, a 2.4 GHz enabling dongle is plugged into the videogame console in order to permit the wireless transmission of control signals between the guitar videogame controller and the videogame console via the 2.4 GHz wireless connection.
  - Wired connection mode
    - The guitar videogame controller is directly connected to the videogame console by a USB-C cord and/or any other suitable electronic wire connector.

Although wireless connection frequencies are referred to in this list and elsewhere herein as "2.4 GHz" for illustrative purposes, any suitable frequency may be utilized.

Examples, Components, and Alternatives

The following sections describe selected aspects of illustrative guitar videogame controllers as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Guitar Videogame Controller

As shown in FIGS. 1-14, this section describes an illustrative guitar videogame controller 100. Guitar videogame controller 100 is configured to be operatively connected via a wired connection (e.g., via a USB-C connector 101) or via a wireless connection (e.g., 2.4 GHz) to any suitable videogame console, e.g., a PC, Nintendo Switch®, PlayStation® 3, 4, or 5, Xbox® Series X or S, etc. Guitar videogame controller 100 is configured to transmit control signals to the videogame console in response to a user actuating one or more buttons of guitar videogame controller 100. As described further below, guitar videogame controller 100 comprises one or more hall effect buttons that permit a user to adjust the performance of guitar videogame controller 100 according to their preferences. Guitar videogame controller 100 is configured to be utilized to play videogames that simulate the user playing a guitar, such as Fortnite Festival®, Guitar Hero®, and/or Rock Band®.

Figure 2:
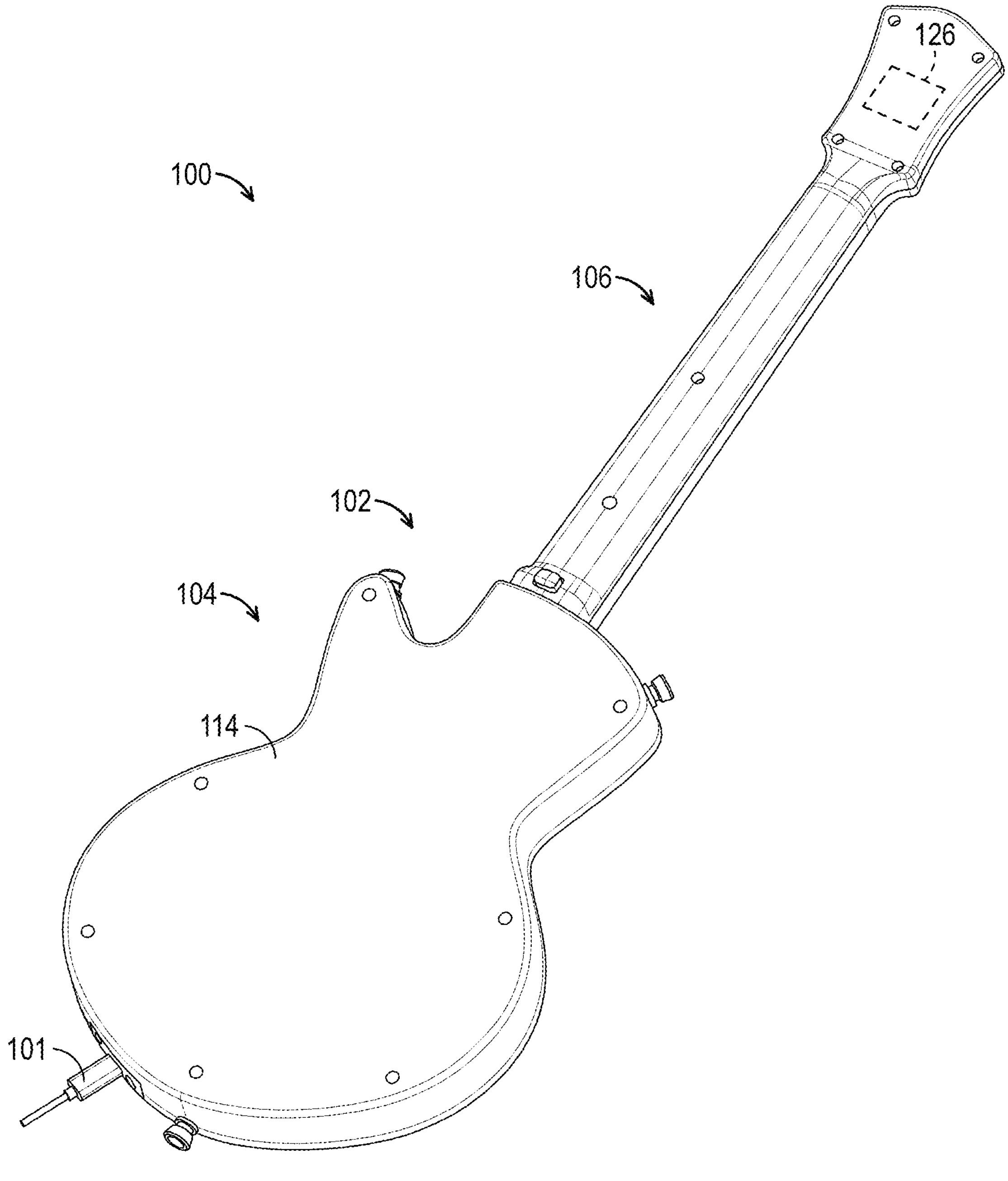
FIG. 2 is a rear isometric view of the guitar videogame controller of FIG. 1.

As shown in FIGS. 1 and 2, guitar videogame controller 100 is shaped similarly to a conventional guitar. For example, guitar videogame controller 100 comprises a housing 102 including a rounded body 104, an elongate neck 106 extending outward from an upper end of rounded body 104, and a fretboard 108 disposed on a front side of elongate neck 106. Housing 102 may comprise any suitable material(s) and/or structure(s) which are configured to support and/or house the other components of guitar videogame controller 100, e.g., a plurality of buttons and internal electronics, such as one or more printed circuit boards 132 of guitar videogame controller 100. For example, guitar videogame controller 100 may comprise any suitable rigid plastic material.

In some examples, one or more portions of housing 102 are modular and configured to be selectively removed and replaced as desired by a user. For example, an entirety or portions of rounded body 104, elongate neck 106, and/or fretboard 108 may be removable and replaceable with different rounded bodies, elongate necks, and/or fretboards having different characteristics, e.g., different shapes, sizes, colors, etc. In some examples, housing 102 includes a mounting plate 130 that is configured to support one or more button(s) (e.g., a strum bar 118 and/or a whammy bar 120) and/or one or more internal electronic components of guitar videogame controller 102 and mounting plate 130 is configured to be operatively coupled to a plurality of different rounded bodies 104 having different characteristics. This facilitates a user customizing guitar videogame controller 100 according to their preferences.

Figure 3:
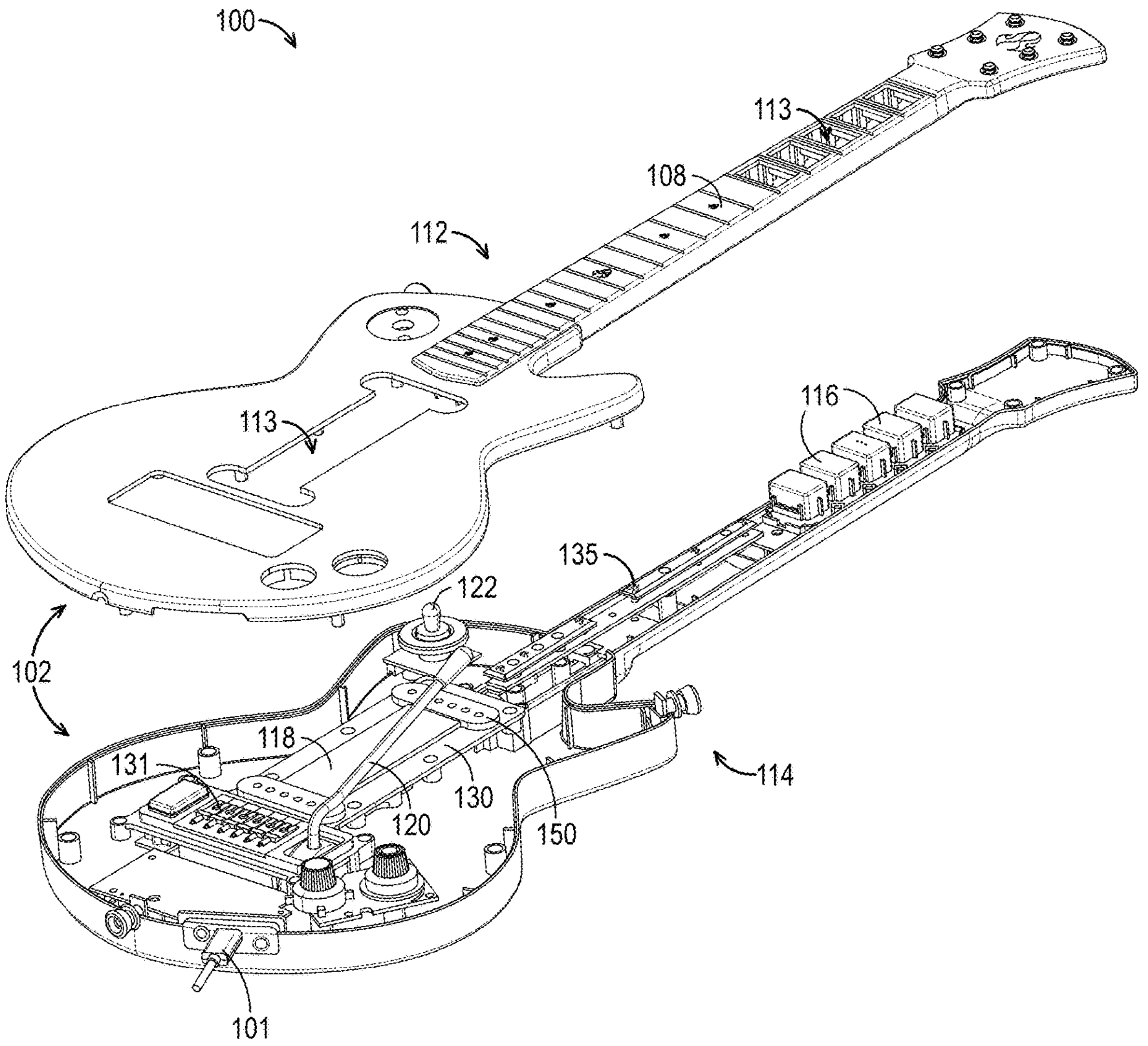
FIG. 3 is a partially exploded view of the guitar videogame controller of FIGS. 1 and 2.
Figure 4:
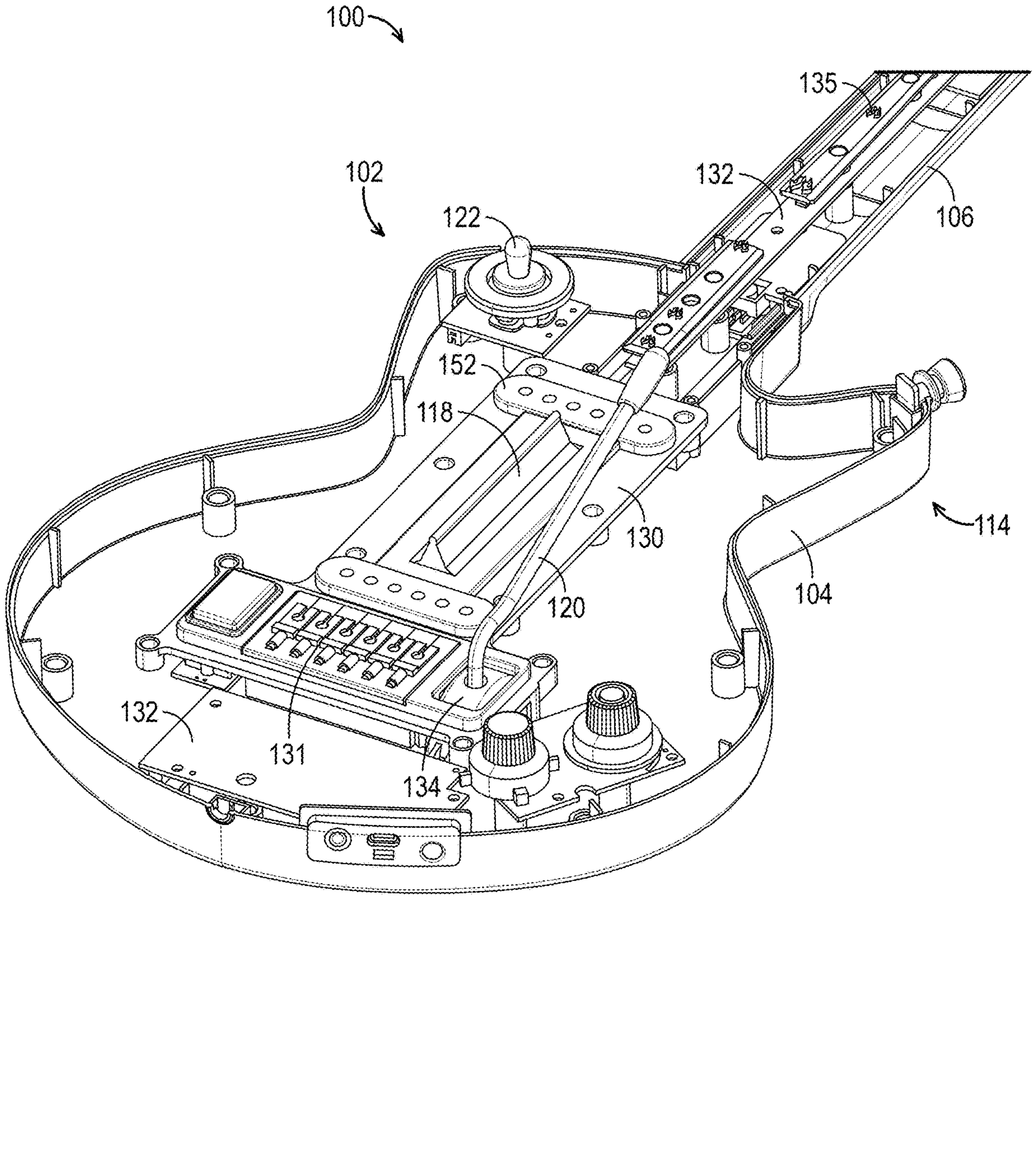
FIG. 4 is an isometric view of a body of the guitar videogame controller of FIGS. 1 and 2 with a front housing removed.
Figure 5:
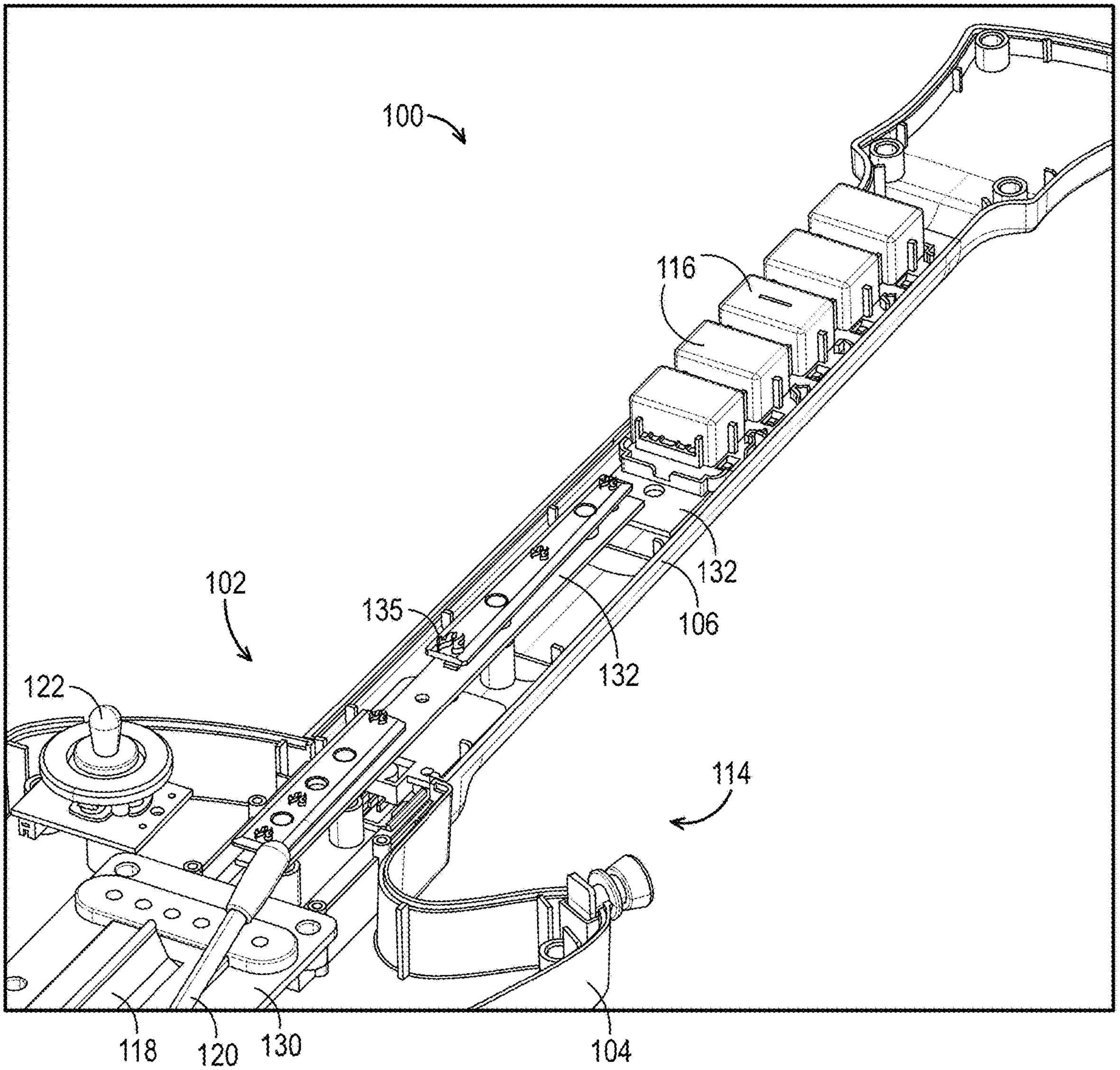
FIG. 5 is an isometric view of an elongate neck of the guitar videogame controller of FIGS. 1 and 2 with a front housing removed.

As shown in FIG. 3 illustrating a partially exploded view of guitar videogame controller 100, in some examples, guitar videogame controller 100 comprises a front housing 112 and a rear housing 114. Front housing 112 and rear housing 114 are configured to be coupled to each other in any suitable manner, e.g., using screws, and to support the one or more buttons and internal electronic components of guitar videogame controller 100. Front housing 112 and/or rear housing 114 may each comprise a single-piece structure or may comprise two or more pieces that are configured to be coupled together in any suitable manner, e.g., using screws.

For example, front housing 112 may include a first piece that forms a front side of rounded body 104 and a second piece that forms a front side of elongate neck 106 when front housing 112 is coupled to rear housing 114. Similarly, rear housing 114 may comprise a first piece that forms a rear side of rounded body 104 and a second piece that forms a rear side of elongate neck 106 when rear housing 114 and front housing 112 are coupled to each other. Alternatively, front housing 112 may comprise a single piece that forms the front side of both rounded body 104 and elongate neck 106 and rear housing 114 may comprise a single piece that forms the rear side of both rounded body 104 and elongate neck 106.

In some examples, the one or more buttons and internal electronic components of guitar videogame controller 100 are coupled to and supported by rear housing 114. In such examples, front housing 112 is configured to be coupled to rear housing 114 in order to enclose and house the internal electronic components of guitar videogame controller 100 between front housing 112 and rear housing 114. In such examples, front housing 112 and/or rear housing 114 may include one or more slots, apertures, and/or openings 113, which are configured to receive the buttons of guitar videogame controller 100 in order to permit a user to access and actuate the buttons when front housing 112 is coupled to rear housing 114.

Guitar videogame controller 100 comprises a plurality of buttons, each of which is configured to be actuated by a user to control one or more actions in a videogame played with guitar videogame controller 100. For example, guitar videogame controller 100 may comprise one or more fret buttons 116 disposed on fretboard 108, a strum bar 118 disposed on a front side of rounded body 104, a whammy bar 120 disposed on a front side of rounded body 104, one or more directional pads 122 (AKA d-pads) having any suitable number of discrete inputs, e.g., 4 discrete inputs or 8 discrete inputs, one or more analog sticks 123, one or more analog touchpads 126 (e.g., on a rear-side of guitar videogame controller 100), and/or any other suitable buttons and/or actuators configured to control one or more aspects of the videogames played with guitar videogame controller 100. Guitar videogame controller 100 is configured to transmit control signals to the videogame console via the wired or wireless connection in response to detecting actuation of one or more of the buttons.

Guitar videogame controller 100 includes one or more digital input buttons (e.g., d-pad(s) 122), one or more analog sticks and/or analog touchpads 126, and/or one or more hall effect buttons (e.g., strum bar 118, whammy bar 120, and/or fret buttons 116). Each of the one or more digital input buttons function as a switch that is either turned on, e.g., in response to a user actuating the button, or otherwise turned off. For example, one or more digital input buttons may be configured as switches on one or more circuit boards 132 of guitar videogame controller 100, such that actuation of the one or more buttons causes electrical signals to be sent through one or more circuit boards 132 to the videogame console via the wired or wireless connection with the videogame console. In some examples, one or more d-pad(s) 122 are configured as digital input buttons having a plurality of discrete input values, e.g., four discrete input values or eight discrete input values. In such examples, pushing up, down, left, right, and/or at angles between up, down, left, or right on d-pad(s) 122 causes guitar videogame controller 100 to transmit a corresponding control signal to the videogame console.

Guitar videogame controller 100 may include any suitable analog stick 123 and/or analog touchpad 126. Each analog stick 123 and/or analog touchpad 126 is configured to output a continuous analog signal indicating a position of analog stick 123 and/or a position of a user's finger on analog touchpad 126. Analog stick 123 and/or analog touchpad 126 may comprise hall effect sensors and/or potentiometers that are configured to detect movement of the analog stick and/or movement of the user's finger on analog touchpad 126. Guitar videogame controller 100 is configured to transmit corresponding control signals to the videogame console based on the detected movement.

Guitar videogame controller 100 further includes one or more hall effect buttons each of which includes a hall effect sensor that is configured to be utilized to detect actuation of the button. For example, one or more of strum bar 118, whammy bar 120, fret buttons 116, and/or any other buttons of guitar videogame controller 100 may comprise hall effect buttons. The one or more hall effect buttons facilitate a user setting their preferred trigger point for the hall effect button, e.g., to what extent the user is required to actuate or move (e.g., rotate and/or linearly translate) the button, and therefore the magnet coupled to the button, in order for guitar videogame controller 100 to register actuation of the button.

In some examples, guitar videogame controller 100 comprises an accelerometer 128, e.g., a 3-axis accelerometer, that is housed within housing 102. In some examples, accelerometer 128 is configured to detect tilting and/or rotation of guitar videogame controller 100 by the user. In some examples, such as when guitar videogame controller 100 is utilized to play the videogame Guitar Hero® or similar, tilting of guitar videogame controller 100 may be configured to activate Star Power or other in-game actions. In such examples, guitar videogame controller 100 is configured to transmit a corresponding signal to the videogame console in response to accelerometer 128 detecting tilting of guitar videogame controller 100 by the user. In FIG. 1, accelerometer 128 is shown as being housed in rounded body 104 of housing 102. However, accelerometer 128 may be housed in any suitable portion of guitar videogame controller 100 including at any suitable position within rounded body 104 or at any suitable position within elongate neck 106.

In some examples, guitar videogame controller 100 comprises one or more LED modules 135 (e.g., an RGB LED module) configured to emit light in response to different in game actions or circumstances. In some examples, one or more LED modules 135 are positioned on a front side of fretboard 108. Guitar videogame controller 100 may comprise any suitable number and arrangement of LED modules 135.

Figure 9:
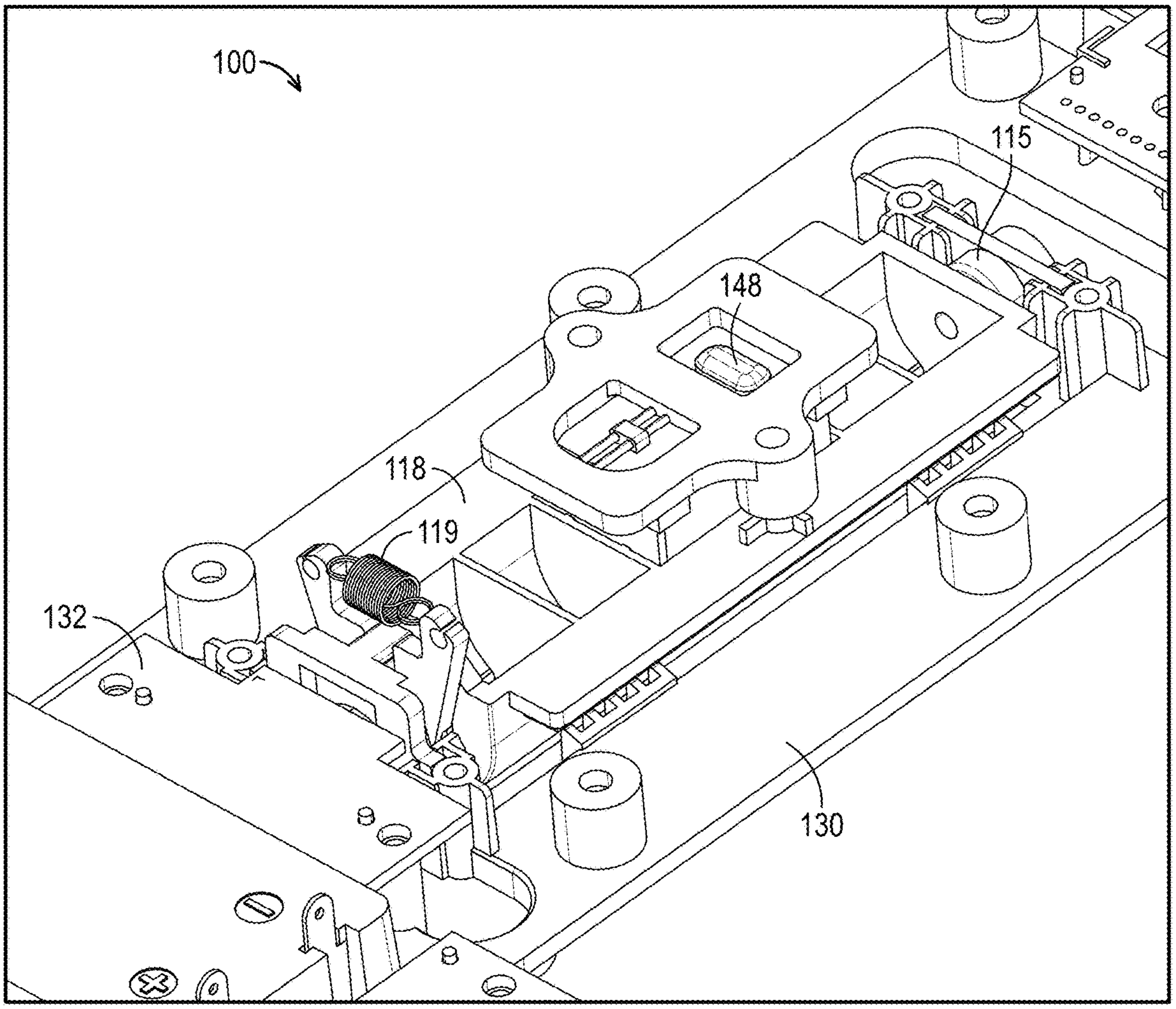
FIG. 9 is a rear isometric view of a hall effect strum bar of the guitar videogame controller of FIGS. 1 and 2.
Figure 10:
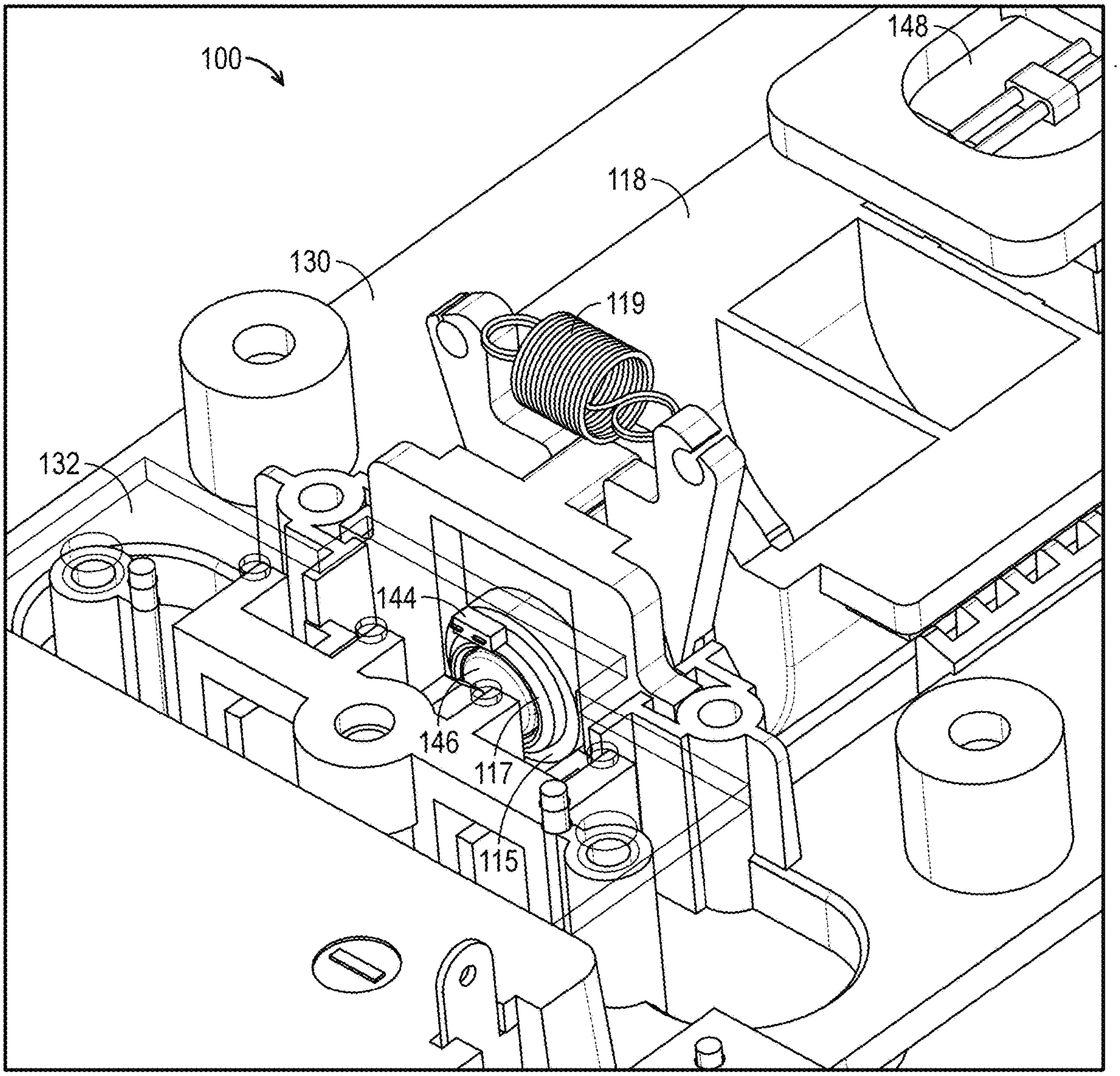
FIG. 10 is a partial rear isometric of the hall effect strum bar of FIG. 9 illustrating a strum-bar hall effect sensor and strum-bar magnet.

In some examples, guitar videogame controller 100 is configured to provide haptic feedback (e.g., vibration and/or clicking) to a user in response to a user actuating one or more of the buttons of the controller or in response to certain circumstances that may occur during gameplay using guitar videogame controller 100. For example, as shown in FIGS. 9 and 10, strum bar 118 may comprise a haptic effect unit 148, which is configured to provide haptic feedback (e.g., vibration and/or clicking) to a user in response to actuation of strum bar 118 or in response to certain circumstances that may occur during gameplay using guitar videogame controller 100. In some examples, haptic effect unit 148 is configured to generate a vibration in response to receiving an electronic control signal from guitar videogame controller 100. Guitar videogame controller 100 may be configured to provide the electronic control signal to haptic effect unit 148 in response to receiving one or more control commands from the videogame console via the wired or wireless connection and/or in response to the user actuating strum bar 118. In some examples, fret buttons 116 and/or any other suitable buttons of guitar videogame controller 100 may further include a respective haptic effect unit that is configured to provide haptic feedback to the user.

Figure 6:
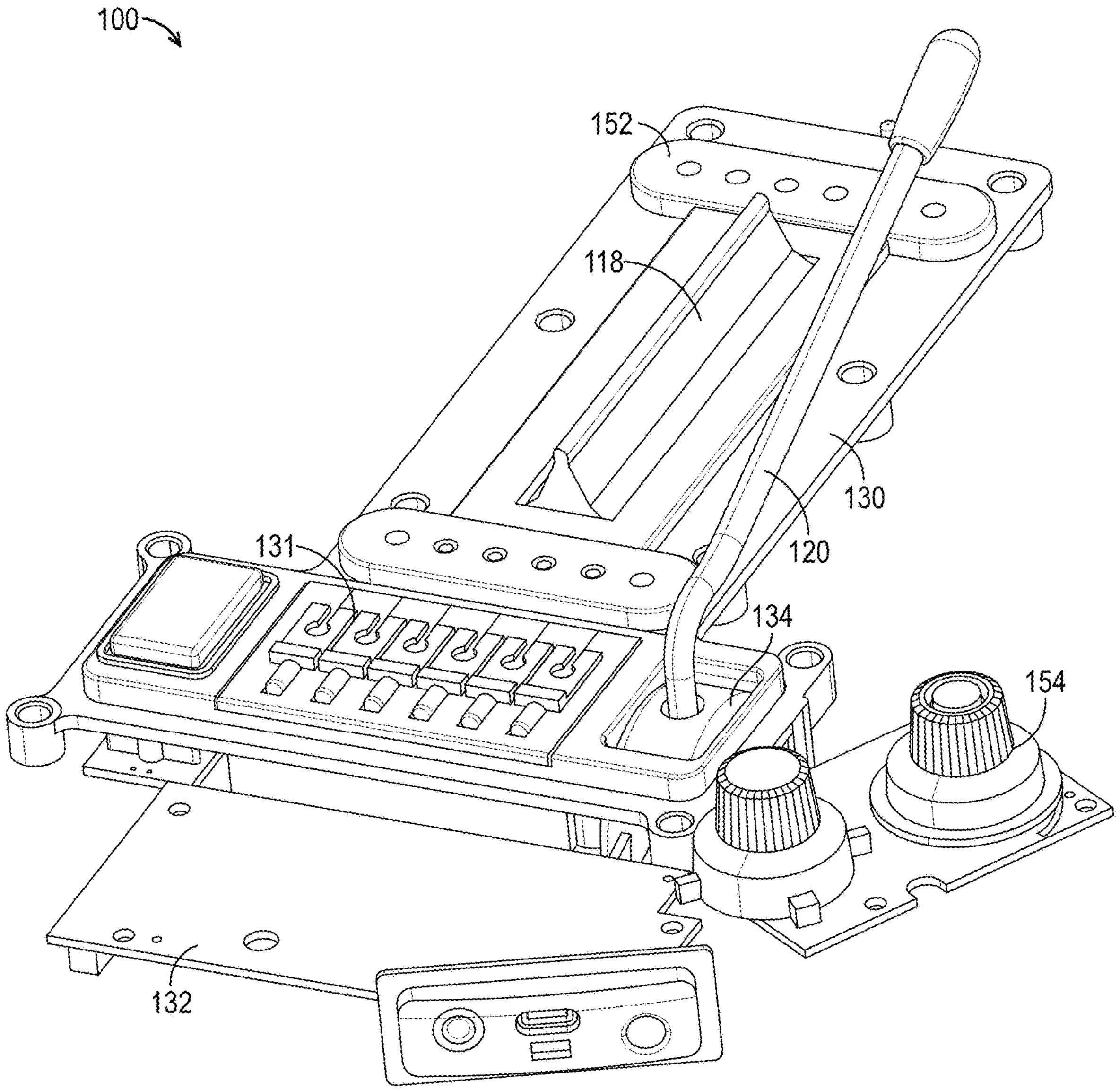
FIG. 6 is a front isometric view of a mounting plate, strum bar, whammy bar, and internal electronic components of the guitar videogame controller of FIGS. 1 and 2.
Figure 7:
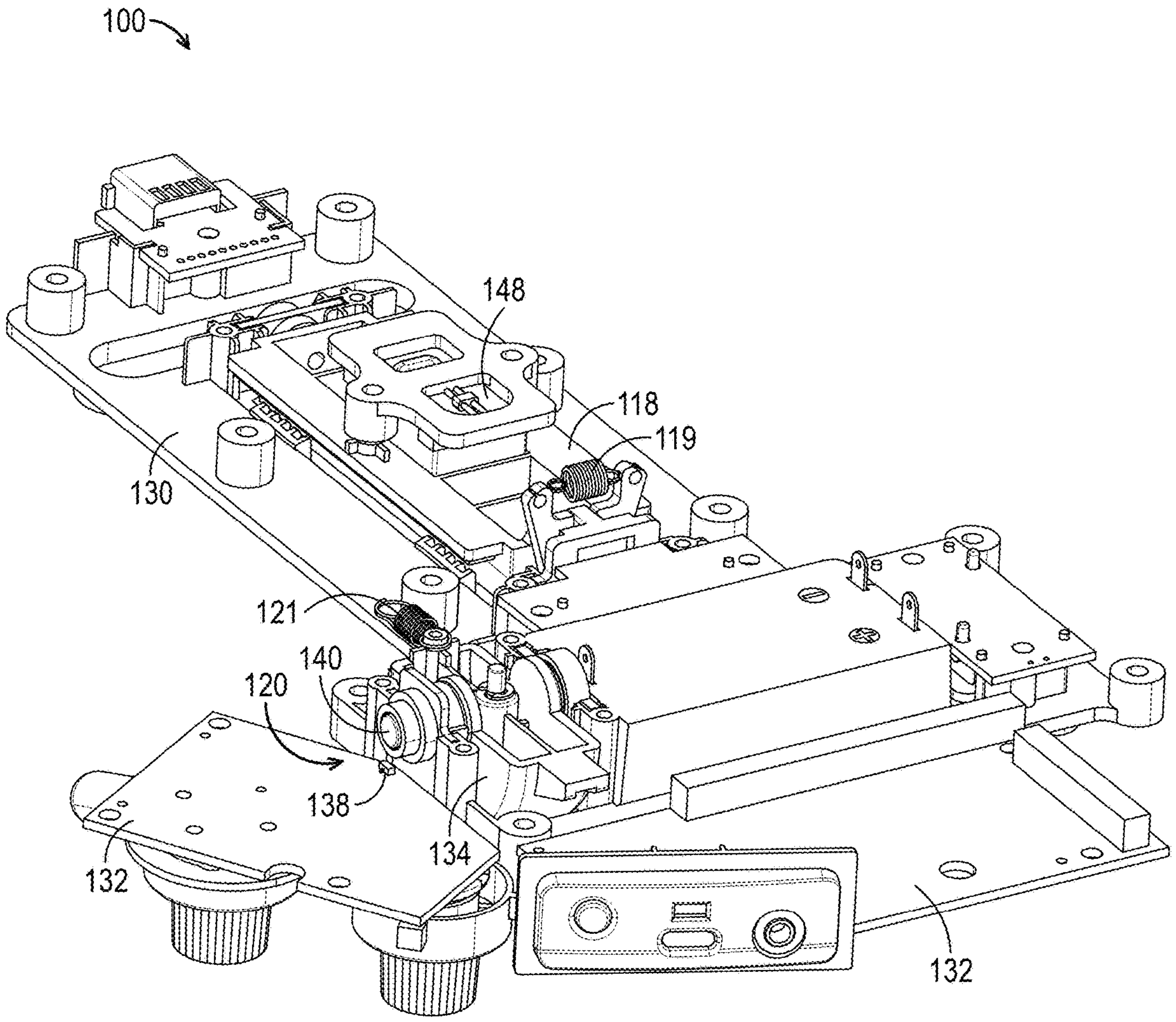
FIG. 7 is a rear isometric view of the mounting plate, strum bar, whammy bar, and internal electronic components of the guitar videogame controller of FIGS. 1 and 2.

Each of the plurality of buttons of guitar videogame controller 100 may include an actuatable button body that is coupled to and/or supported by housing 102 in any suitable manner and that is configured to be actuated by the user in any suitable manner, e.g., pushed, rotated, etc. In some examples, as shown in FIGS. 4-7, housing 102 of guitar videogame controller 100 comprises a mounting plate 130, which is configured to support one or more of the buttons and one or more of the internal electronic components of guitar videogame controller 100. For example, as shown in FIGS. 6 and 7, mounting plate 130 supports strum bar 118, whammy bar 120, and one or more printed circuit boards 132 of guitar videogame controller 100. In some examples, mounting plate 130 is operatively coupled to rounded body 104 of housing 102. In some examples, mounting plate 130 comprises a battery compartment 131 that is configured to receive one or more batteries to provide electrical power to guitar videogame controller 100. In some examples, mounting plate 130 comprises a dongle compartment 152 configured to receive and house a 2.4 GHz enabling dongle 150 of guitar videogame controller 100 when dongle 150 is not being used to provide wireless connection between guitar videogame controller 100 and the videogame console.

Strum bar 118 comprises an actuatable button body that is configured to be selectively actuated by rotating strum bar 118 relative to housing 102. Strum bar 118 may have any suitable shape and/or size and may comprise any suitable substantially rigid material, e.g., a rigid plastic material. In some examples, as shown most clearly in FIG. 4, strum bar 118 has an elongate shape and stum bar 118 extends generally along a longitudinal axis of guitar videogame controller 100.

As shown most clearly in FIGS. 9-10, strum bar 118 is rotatably connected to mounting plate 130 and is configured to be selectively rotated relative to mounting plate 130 about an axis of rotation (e.g., a strum-bar axis of rotation). For example, one or more stum-bar bearings 115 (e.g., plain bearings) may be coupled to mounting plate 130 and strum bar 118 may include one or more strum-bar posts 117 that are operatively received within strum-bar bearing(s) 115 to form one or more revolute joints permitting rotation of strum bar 118 relative to mounting plate 130. Strum-bar bearing(s) 115 may comprise plain bearings having a bearing surface and strum-bar post(s) 117 may be configured to slide relative to the bearing surface of strum-bar bearing(s) 115 to permit rotation of strum bar 118 relative to rounded body 104. In some examples, the strum-bar axis of rotation is parallel or at least substantially parallel to a longitudinal axis of guitar videogame controller 100.

Rotating strum bar 118 in either direction, e.g., clockwise or counterclockwise, is configured to actuate strum bar 118. Strum bar 118 may be configured to be returned to a neutral position (e.g., non-rotated position) after being released by a user. For example, strum bar 118 may comprise a strum-bar spring 119, which is configured to be connected to any suitable portion of housing 102 and to return strum bar 118 to an unactuated position when strum bar 118 is released by the user. As described further below and shown in FIG. 10, in some examples, strum bar 118 comprises a hall effect button including a strum-bar hall effect sensor 144 and a strum-bar magnet 146.

Whammy bar 120 comprises an actuatable body that is configured to be selectively actuated by rotating whammy bar 120 relative to housing 102, as discussed below. Whammy bar 120 may have any suitable shape and/or size and may comprise any suitable substantially rigid material, e.g., a rigid plastic material. In some examples, as shown in FIG. 1, whammy bar 120 includes an elongate portion that extends upward and outward from a front surface of housing 102 and that is configured to be grasped by a user to actuate whammy bar 120.

Whammy bar 120 is operatively connected to mounting plate 130 and is configured to be selectively rotated relative to mounting plate 130 about an axis of rotation (e.g., a whammy-bar axis of rotation). In some examples, the whammy-bar axis of rotation is transverse (e.g., perpendicular) to the longitudinal axis of guitar videogame controller 100. As shown most clearly in FIGS. 6 and 8, whammy bar 120 comprises a rotating base 134 that is rotatably coupled to mounting plate 130, such that whammy bar 120 is configured to be rotated relative to mounting plate 130 in response to a user pulling or pushing on whammy bar 120. For example, one or more whammy-bar bearings 139 (e.g., plain bearings) may be coupled to mounting plate 130 and rotating base 134 of whammy bar 120 may include one or more whammy-bar posts 137 that are operatively received within whammy-bar bearing(s) 139 to form one or more revolute joints permitting rotation of rotating base 134 and whammy bar 120 relative to mounting plate 130. Whammy-bar bearing(s) 139 may comprise plain bearings having a bearing surface and whammy-bar post(s) 137 may be configured to slide relative to the bearing surface of whammy-bar bearing(s) 139 to permit rotation of whammy bar 120 relative to mounting plate 130 and rounded body 104.

Figure 8:
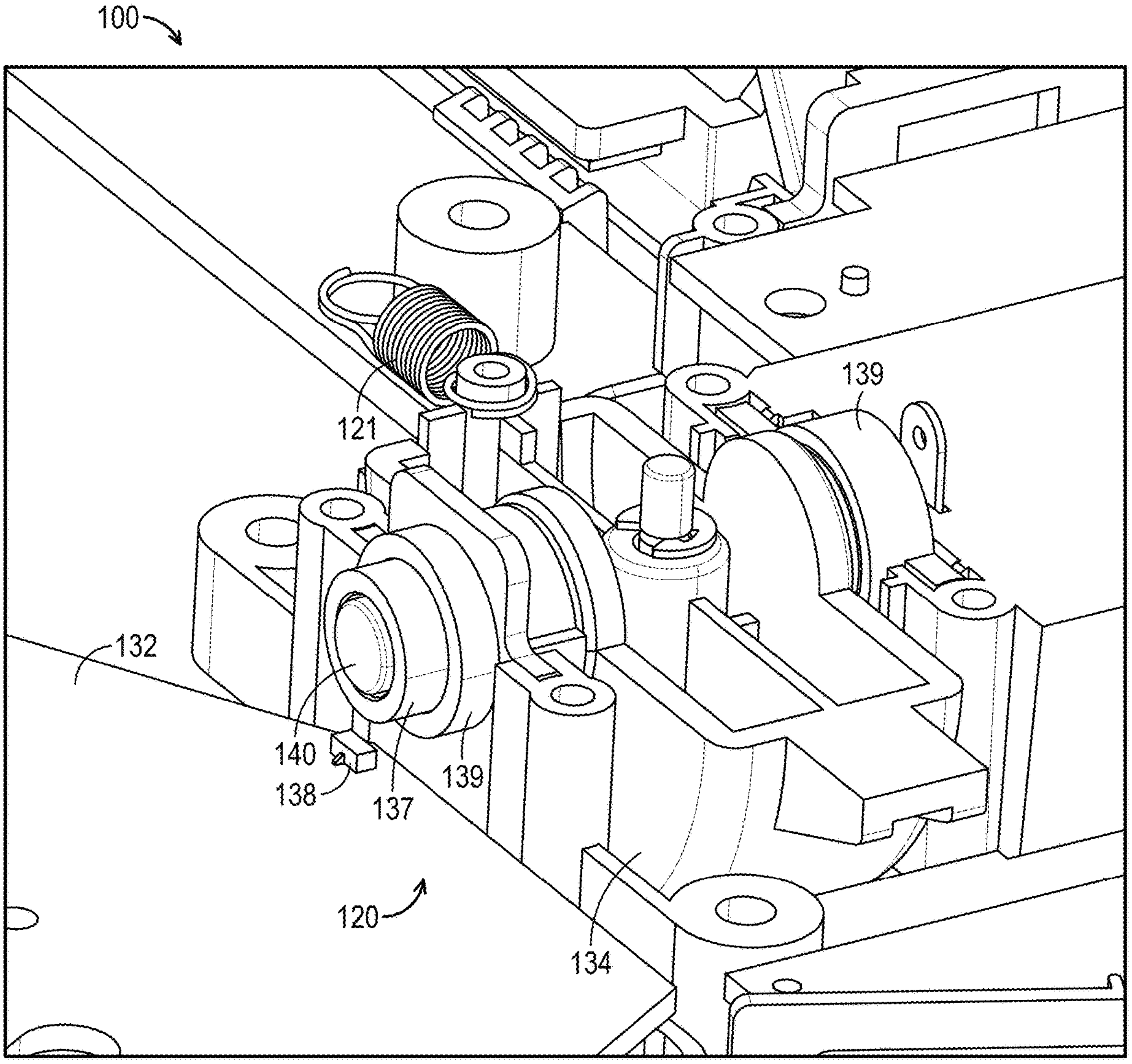
FIG. 8 is a rear isometric view of a rotating base of a hall effect whammy bar of the guitar videogame controller of FIGS. 1 and 2.

Rotating whammy bar 120 is configured to actuate whammy bar 120 and cause guitar videogame controller 100 to transmit one or more corresponding control signals to videogame console. In some examples, whammy bar 120 comprises a whammy-bar spring 121 configured to be connected to housing 102 and configured to return whammy bar 120 to a neutral position (e.g., a non-rotated position) after whammy bar 120 has been released by the user. As described further below and as shown in FIG. 8, in some examples, whammy bar 120 comprises a hall effect button including a whammy-bar hall effect sensor 138 and a whammy-bar magnet 140.

Figure 11:
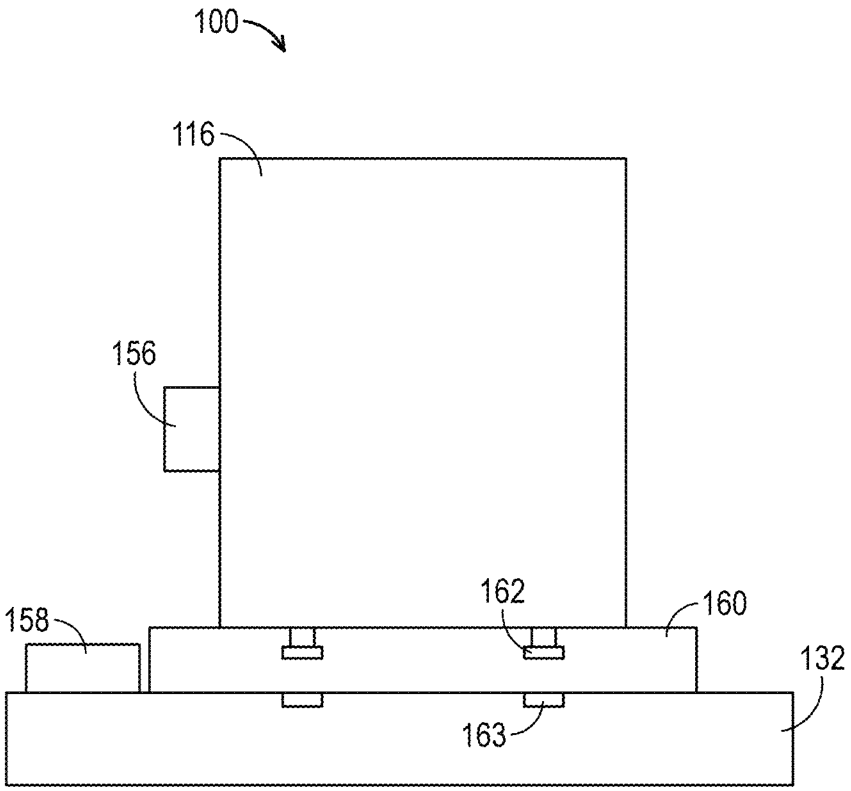
FIG. 11 is a schematic illustration of a hall effect fret button of the guitar videogame controller of FIGS. 1 and 2.

As schematically illustrated in FIG. 11, each fret button 116 may be configured as a push button, which includes an actuatable button body that is configured to be pushed downward by the user to actuate fret button 116. For example, a resilient compressible substrate 160 and/or a spring may be positioned beneath fret button 116 to facilitate fret button 116 being pushed downward to actuate fret button 116. In some examples, the resilient compressible substrate 160 and/or spring is configured to return fret button 116 to an unactuated position when the user releases fret button 116.

In some examples, pushing fret button 116 downward is configured to cause contact between fret-button electrical contacts 162 disposed on fret button and/or on the resilient compressible substrate and corresponding electrical contacts 163 on one of circuit boards 132 of guitar videogame controller 100. This causes control signals to be sent through one or more circuit boards 132 to the videogame console via the wired or wireless connection with the videogame console. Additionally, or alternatively, fret buttons 116 may each comprise a hall effect button including a fret-button magnet 156 and a fret-button hall effect sensor 158. In such examples, guitar videogame controller 100 may determine that fret button 116 has been actuated based on a magnetic field detected by fret-button hall effect sensor 158.

Each of the hall effect buttons (e.g., whammy bar 120, strum bar 118, and/or fret buttons 116) of guitar videogame controller 100 comprises a hall effect sensor (e.g., whammy-bar hall effect sensor 138, strum-bar hall effect sensor 144, and/or fret-button hall effect sensor 158), which is configured to produce an output signal that is proportional to the strength of the magnetic field (e.g., the magnetic field generated by strum-bar magnet 146, whammy-bar magnet 140, and/or fret-button magnet 156) at the hall effect sensor at any given time. Specifically, the hall effect sensor is configured to produce an output signal that is proportional to the magnitude of an axial component of the magnetic field that is perpendicular to a sensing surface of the hall effect sensor. For example, the hall effect sensor may comprise any suitable hall element (e.g., a semiconductor sheet) having a sensing surface across which a voltage is applied, resulting in an electrical current flowing across the sensing surface. When a magnetic field is applied perpendicular to the electrical current flowing across the sensing surface, a voltage is induced across the sensing surface that is proportional to the strength of the magnetic field perpendicular to the sensing surface, as a result of the hall effect. This facilitates the hall effect sensor being configured to detect both rotation of the magnet of the hall effect button relative to the hall effect sensor (e.g., a rotation angle) and linear translation of the magnet relative to the hall effect sensor and to produce a corresponding output signal. Guitar videogame controller 100 is configured to utilize the output signal produced by the hall effect sensor to determine when the hall effect button is actuated.

The output signal that is produced by the hall effect sensor may comprise an analog voltage signal, a pulse-width modulation (PWM) signal, and/or a digital signal. The analog voltage signal, the pulse-width modulation (PWM) signal, and/or the digital signal output by the hall effect sensor is proportional to the strength of the magnetic field perpendicular to the hall effect sensor. As described further below, guitar videogame controller 100 comprises a control system 200 which is configured to analyze the analog voltage signal, the pulse-width modulation (PWM) signal, and/or the digital signal output by the hall effect sensor to determine whether the hall effect button has been actuated or not.

The hall effect buttons are configured to permit a user to adjust the trigger point of each of the hall effect buttons according to their preferences. For example, when the user actuates or moves (e.g., rotates or linearly translates) the button, the magnet attached to the button is also moved relative to the hall effect sensor, which causes a change in the analog voltage signal and/or pulse-width modulation signal output by the hall effect sensor. In other words, the analog or pulse-width modulation signal that is output by the hall effect sensor indicates how far the button has been rotated (e.g., the rotational angle) and/or translated relative to the hall effect sensor. Using the output signal from the hall effect sensor, different movement thresholds may be set for each hall effect button, e.g., how far the button needs to be rotated or linearly translated in order for guitar videogame controller to register actuation of the button and transmit corresponding control signals to the videogame console.

In some examples, whammy bar 120 comprises a hall effect button. As shown in FIG. 8 illustrating a close-up view of rotating base 134 of whammy bar 120 from a rear side, whammy bar 120 includes a whammy-bar hall effect sensor 138 and a whammy-bar magnet 140. Whammy-bar magnet 140 is coupled to rotating base 134 of whammy bar 120, such that whammy-bar magnet 140 is configured to rotate with rotating base 134 when a user actuates whammy bar 120, e.g., by pulling or pushing on whammy bar 120. For example, as shown in FIG. 8, whammy-bar magnet 140 may be coupled to a distal end of a respective one of whammy-bar post(s) 137 that is operatively received within a respective one of whammy-bar bearing(s) 139. Whammy-bar magnet 140 may be coupled to rotating base 134 (e.g., whammy-bar post(s) 137) using a press-fit or snap-fit arrangement, by embedding the magnet within rotating base 134, using adhesives, and/or in any other suitable manner. Whammy-bar hall effect sensor 138 is coupled to one of circuit board(s) 132 of guitar videogame controller 100 and is configured to remain in a stationary position relative to rotating base 134. Whammy-bar hall effect sensor 138 is configured to detect movement (e.g., rotation) of whammy bar 120 based on the strength of the magnetic field detected by whammy-bar hall effect sensor 138 and to generate a corresponding output signal that indicates or is proportional to the strength of the magnetic field at whammy-bar hall effect sensor 138. Guitar videogame controller 100 is configured to utilize the output signal from whammy-bar hall effect sensor 138 to register or detect actuation of whammy bar 120.

As shown in FIGS. 9 and 10 illustrating rear views of mounting plate 130 and strum bar 118, strum bar 118 comprises a strum-bar hall effect sensor 144 and a strum-bar magnet 146. Strum-bar magnet 146 is coupled to strum bar 118, such that strum-bar magnet 146 is configured to rotate with strum bar 118 relative to mounting plate 130. For example, as shown in FIG. 10, strum-bar magnet 146 may be coupled to a distal end of a respective one of strum-bar post(s) 117 operatively received within a respective one of strum-bar bearing(s) 115. Strum-bar magnet 146 may be coupled to strum bar 118 (e.g., strum-bar post(s) 117) using a press-fit or snap-fit arrangement, by embedding the magnet within a portion of strum bar 118, using adhesives, and/or in any other suitable manner. Strum-bar hall effect sensor 144 is operatively coupled to one or circuit board(s) 132 and is configured to remain in a stationary position relative to strum bar 118 and strum-bar magnet 146. Strum-bar hall effect sensor 144 is configured to detect movement (e.g., rotation) of strum bar 118 based on the strength of the magnetic field detected by strum-bar hall effect sensor 144 and to generate a corresponding output signal. Guitar videogame controller 100 utilizes the output signal from strum-bar hall effect sensor 144 to register or detect when strum bar 118 is actuated.

In some examples, as shown in FIG. 11, fret buttons 116 may each comprise a hall effect button. In such examples, a fret-button magnet 156 may be attached to each fret button 116 (e.g., using a snap-fit arrangement, adhesives, embedding, etc.) and each fret button 116 may have a respective fret-button hall effect sensor 158. When fret button 116 is pushed downward by the user to actuate fret button 116, fret-button magnet 156 is translated relative to fret-button hall effect sensor 158, which causes a change in the magnitude of the magnetic field at fret-button hall effect sensor 158. Fret-button hall effect sensor 158 produces a corresponding output signal that is utilized by guitar videogame controller 100 to determine actuation of fret button 116.

Guitar videogame controller 100 may comprise any suitable control system(s) 200 configured to utilize the output signal from the hall effect sensors to determine one or more corresponding control signal(s) to transmit to the videogame console. For example, control system 200 may be configured to determine whether the hall effect button was actuated or not based on an analog voltage signal or pulse-width modulation (PWM) signal output by the hall effect sensor and transmit this information to the videogame console.

Figure 12:
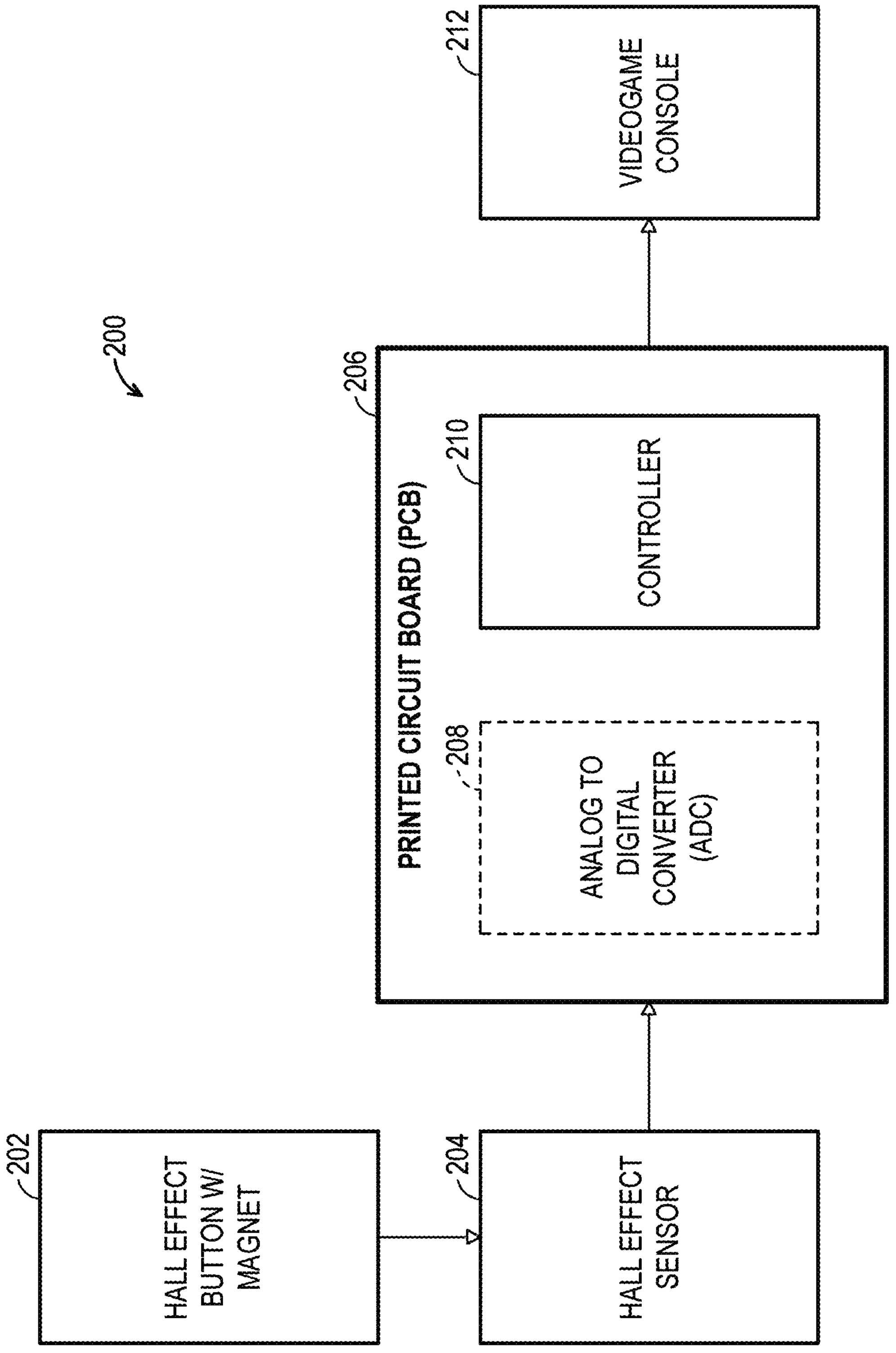
FIG. 12 is a schematic illustration of an example control system of the guitar videogame controller of FIGS. 1 and 2.

Control system 200 is schematically illustrated in FIG. 12. In some examples, control system 200 is configured to be implemented by guitar videogame controller 100 to convert actuation of whammy bar 120, strum bar 118, and/or fret buttons 116 into corresponding control signal(s) that are transmitted to a videogame console 212. As shown in FIG. 12, control system 200 includes a hall effect button 202 (e.g., whammy bar 120, strum bar 118, and/or fret buttons 116) including a magnet (e.g., whammy-bar magnet 140, strum-bar magnet 146, and/or fret-button magnet 156) attached to hall effect button 202. Hall effect button 202 is positioned proximate a hall effect sensor 204 (e.g. whammy-bar hall effect sensor 138, strum-bar hall effect sensor 144, and/or fret-button hall effect sensor 158), such that hall effect sensor 204 is subjected to a magnetic field generated by the magnet. Hall effect sensor 204 is fixed relative to housing 102 and hall effect button 202. Hall effect sensor 204 is configured to produce an output signal (e.g., analog voltage signal or pulse-width modulation (PWM) signal) that is proportional to a magnitude of the component of the magnetic field that is perpendicular to the hall effect sensor 204 at any given time. In some examples, the hall effect sensor 204 is configured to continuously produce the output signal (e.g., the analog voltage signal or pulse-width modulation signal) indicating the magnitude of the magnetic field as the magnetic field varies through time. Alternatively, in some examples, the hall effect sensor 204 is configured to produce the output signal in response to the magnitude of the magnetic field exceeding or otherwise meeting a threshold magnitude. In some examples, hall effect sensor 204 and/or control system 200 may further include an amplifier that is configured to amplify the output signal generated by hall effect sensor 204, such that the output signal is at a suitable signal strength to be analyzed by a controller 210 of control system 200.

As shown in FIG. 12, control system 200 further comprises a printed circuit board 206 (e.g., circuit board(s) 132) supporting one or more components that are configured to receive as input the output signal from hall effect sensor 204 and to determine one or more corresponding control signals to transmit to videogame console 212 based on the output signal from hall effect sensor 204. For example, control system 200 may comprise an analog to digital (ADC) converter and/or a controller 210 (e.g., a microcontroller).

In some examples, hall effect sensor 204 is configured to output (e.g., continuously output) an analog voltage signal that is proportional to the magnetic field at hall effect sensor 204. In such examples, control system 200 may include an analog to digital converter 208. Analog to digital converter 208 is configured to receive as input the analog voltage signal corresponding to the magnetic field strength at hall effect sensor 204 and to convert the analog voltage signal into a digital signal that can be analyzed by controller 210. In some examples, whammy-bar hall effect sensor 138 is configured to output an analog voltage signal corresponding to the magnetic field detected by whammy-bar hall effect sensor 138. In such examples, an analog to digital converter 208 may be utilized to convert the output signal from whammy-bar hall effect sensor 138 into a digital signal that is readable by controller 210.

Alternatively, in some examples, hall effect sensor 204 is configured, e.g., via programming logic and/or electronic circuitry, to output a pulse-width modulation (PWM) signal that is proportional to the magnetic field strength at hall effect sensor 204. For example, the amplitude and/or the duty cycle of the pulse-width modulation signal output by hall effect sensor 204 may indicate the magnetic field strength at hall effect sensor 204. In some examples, strum-bar hall effect sensor 144 and/or fret-button hall effect sensor 158 is configured to output a pulse-width modulation (PWM) signal corresponding to the magnetic field strength at the hall effect sensor. In some such examples, control system 200 may not include analog to digital converter 208 and the pulse-width modulation (PWM) signal may be directly transmitted to controller 210.

Alternatively, in some examples, hall effect sensor 204 is configured, e.g., via programming logic and/or electronic circuitry, to output a digital signal that is proportional to the magnetic field strength at hall effect sensor 204. In some examples, hall effect sensor 204 is configured to output the digital signal in response to the magnetic field strength at hall effect sensor 204 exceeding or otherwise meeting a threshold strength. In some examples, the threshold strength is set at a predetermined value that indicates when hall effect button 202 has been actuated or moved from an unactuated position. For example, when the hall effect button 202 is in an unactuated position, the magnetic field strength may not meet the threshold strength and hall effect sensor 204 does not output the digital signal. In such examples, moving or actuating hall effect button 202 causes the magnetic field strength at hall effect sensor 204 to meet the threshold strength and, in response, hall effect sensor 204 is configured to output the digital signal.

Controller 210 (e.g., a microcontroller) comprises processing logic that is configured to analyze one or more output signal(s) (e.g., analog voltage signals and/or pulse-width modulation signals) from hall effect sensor 204 that are proportional to the strength of the magnetic field detected by hall effect sensor 204. Controller 210 is configured to determine one or more corresponding control signal(s) to transmit to videogame console 212 based on the output signal(s). For example, controller 210 may determine that if the output signal from hall effect sensor 204 at any given time is at, above, or below a threshold level, this indicates that hall effect button 202 has been actuated by the user. In some examples in which the output signal(s) are pulse-width modulation signal(s), controller 210 may compare the duty cycle and/or amplitude of the pulse-width modulation signal(s) to respective threshold values to determine whether hall effect button 202 has been actuated. As discussed above, the duty cycle and/or the amplitude of the pulse-width modulation signal(s) output by hall effect sensor 204 may indicate or be proportional to the magnetic field strength at hall effect sensor 204.

The output signal(s) being at, above, or below the threshold level may indicate that hall effect button 202 has been moved by a certain amount relative to hall effect sensor 204, which changed the magnetic field strength detected by hall effect sensor 204 and therefore the output signal produced by hall effect sensor 204. Controller 210 may then transmit any control signals to videogame console 212 that correspond to detected actuation of hall effect button 202. The control signals that are transmitted by controller 210 to videogame console 212 may indicate that hall effect button 202 was actuated and, in some examples, to what extent hall effect button 202 was actuated (e.g., the distance hall effect button 202 was moved).

In some examples, guitar videogame controller 100 is configured to permit the user to adjust the trigger point of hall effect button 202. For example, guitar videogame controller 100 may be configured to receive a user input indicating a desired trigger point of hall effect button 202 and adjust the threshold level at which controller 210 is configured to register actuation of hall effect button 202. Adjusting the threshold level is configured to adjust the actuation distance that hall effect button 202 is required to be moved (e.g., rotated or linearly translated) in order for controller 210 to register that hall effect button 202 has been actuated by the user. In some examples, guitar videogame controller 100 may have a plurality of preset trigger points (e.g., discrete value threshold levels) that each correspond to a different threshold actuation distance of hall effect button 202 that hall effect button 202 is required to be moved (e.g., an angle of rotation or linear translation distance) relative to an unactuated position in order for control system 200 to register that hall effect button 202 was actuated. For example, a plurality of trigger points may be preset within a range between a selected minimum actuation distance of hall effect button 202 and a maximum possible actuation distance of hall effect button 202. In such examples, the user is able to select any one of the preset trigger points according to their preferences.

In some examples, the preset trigger points include preset sensitivity levels and/or sensitivity percentages. For example, a user may be able to select a sensitivity level from 1 to 5 for hall effect button 202, each sensitivity level corresponding to a different threshold actuation distance of hall effect button 202, e.g., where the levels progress from a lower threshold to a higher threshold. In some examples, the user is able to select a sensitivity percentage, e.g., from 1% to 100%, for hall effect button 202, where 100% corresponds to a maximum threshold actuation distance of hall effect button 202 and 1% corresponds to a minimum threshold actuation distance of hall effect button 202 or vice versa. In such examples, sensitivity percentages between 1% and 100% (e.g., 50%) correspond to thresholds between the minimum and maximum actuation distances of hall effect button 202.

In some examples, guitar videogame controller 100 comprises multiple hall effect buttons 202, e.g., strum bar 118, whammy bar 120, and/or fret button(s) 116. In such examples, each hall effect button 202 may have a different minimum threshold actuation distance and/or maximum threshold actuation distance and/or may be actuated in a different manner, e.g., linearly translated or rotated. As a result, different sensitivity levels and/or sensitivity percentages may correspond to different threshold actuation distances for each of the different hall effect buttons 202. For example, a sensitivity level of 3 may correspond to different threshold actuation distances for whammy bar 120, strum bar 118, and/or fret button(s) 116, but may correspond to a threshold actuation distance that is half-way between a minimum and maximum threshold actuation distance for each of whammy bar 120, strum bar 118, and fret button(s) 116.

The system may be configured to enable a user to select their preferred trigger point or threshold actuation distance for each of hall effect buttons 202 collectively (e.g., as a group or subgroup), globally, and/or individually. For example, a user may be able to input a desired sensitivity level (e.g., one of sensitivity levels 1 to 5) and/or a desired sensitivity percentage (e.g., a sensitivity percentage from 1% to 100%) for each of hall effect buttons 202 collectively, such that each hall effect button 202 of guitar videogame controller 100 has the same sensitivity level or sensitivity percentage. Alternatively, or additionally, in some examples, the user is able to adjust the preset trigger point (e.g., sensitivity level or sensitivity percentage) of each of hall effect buttons 202 individually. For example, the sensitivity level of whammy bar 120 may be set at sensitivity level 5 and the sensitivity level of strum bar 118 may be set at the sensitivity level 2.

In some examples, controller 210 is configured to transmit control signals to videogame console 212 indicating the extent that hall effect button 202 was actuated (e.g., the distance hall effect button 202 was moved). For example, controller 210 may determine the distance hall effect button 202 was rotated and/or linearly translated from an unactuated position based on the output signal from hall effect sensor 204 and transmit the actuation distance to videogame console 212. Explained in other words, in addition to determining whether hall effect button 202 was actuated or not, controller 210 may be configured to determine the degree of movement of hall effect button 202 and transmit corresponding control signals to videogame console 212. In such examples, moving hall effect button 202 by different amounts may result in different in game actions.

Guitar videogame controller 100 may be configured to receive the user input indicating their desired trigger point in any suitable manner. For example, guitar videogame controller 100 may be configured to receive the user input via a 2.4 GHz wireless connection with an app on the user's mobile device and/or computer. For example, guitar videogame controller 100 may have any suitable wireless receiving and/or transmitting device (e.g., a 2.4 GHz receiver and/or transmitter) that is configured to receive and/or transmit signals via 2.4 GHz wireless and/or via any other wireless frequencies.

Control system 200 may be utilized to determine when each of the hall effect buttons of guitar videogame controller 100 have been actuated. In some examples, as described above, whammy-bar hall effect sensor 138 is configured to output an analog voltage signal. Accordingly, analog to digital converter 208 may be utilized to convert the analog voltage signal from whammy bar 120 into a digital signal. In some examples, fret-button hall effect sensor 158 and/or strum-bar hall effect sensor 144 may be configured to output a pulse-width modulation (PWM) signal corresponding to the magnetic field at the respective hall effect sensor. In such examples, an analog to digital converter may not be utilized to modify the pulse-width modulation (PWM) signal output by fret buttons 116 and strum bar 118. In such examples, controller 210 may be configured to analyze the pulse-width modulation signal from fret-button hall effect sensor 158 and strum-bar hall effect sensor 144 directly. Each of the hall effect buttons of guitar videogame controller 100 may be configured to output any suitable signal indicating the magnetic field strength at the hall effect sensor, e.g., analog voltage signals and/or pulse-width modulation (PWM) signals. Guitar videogame controller 100 may include any suitable number of control systems 200. For example, guitar videogame controller 100 may include a single controller 210 configured to analyze the output signals generated by the hall effect sensors 204 of a plurality of hall effect buttons 202 (e.g., whammy bar, strum bar, fret buttons, etc.) of guitar videogame controller 100. Alternatively, in some examples, guitar videogame controller 100 may comprise multiple controllers 210 each configured to register actuation of one or more hall effect buttons 202 of guitar videogame controller 100.

Figure 13:
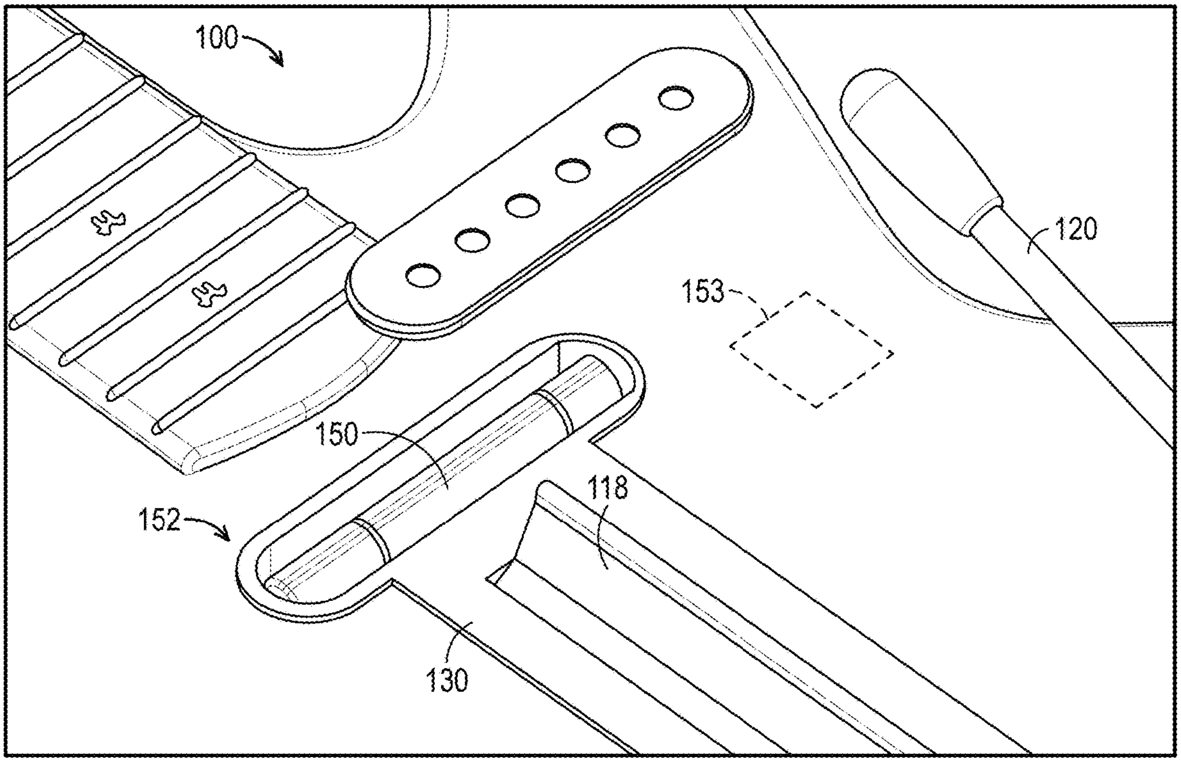
FIG. 13 is an isometric view of a dongle and dongle compartment of the guitar videogame controller of FIGS. 1 and 2

In some examples, guitar videogame controller 100 is configured to operate in different connection modes with the videogame console. For example, as shown in FIG. 13, guitar videogame controller 100 may include a corresponding 2.4 GHz enabling dongle 150 that is configured to be plugged into the videogame console in order to permit wireless transmission of control signals between guitar videogame controller 100 and the videogame console via 2.4 GHz. In such examples, guitar videogame controller 100 may have any suitable onboard 2.4 GHz wireless receiving and/or transmitting device 153 that is configured to receive and/or transmit signals with the videogame console via 2.4 GHz. Although wireless connection frequencies are referred to in this list and elsewhere herein as "2.4 GHz" for illustrative purposes, any suitable frequency may be utilized.

Figure 14:
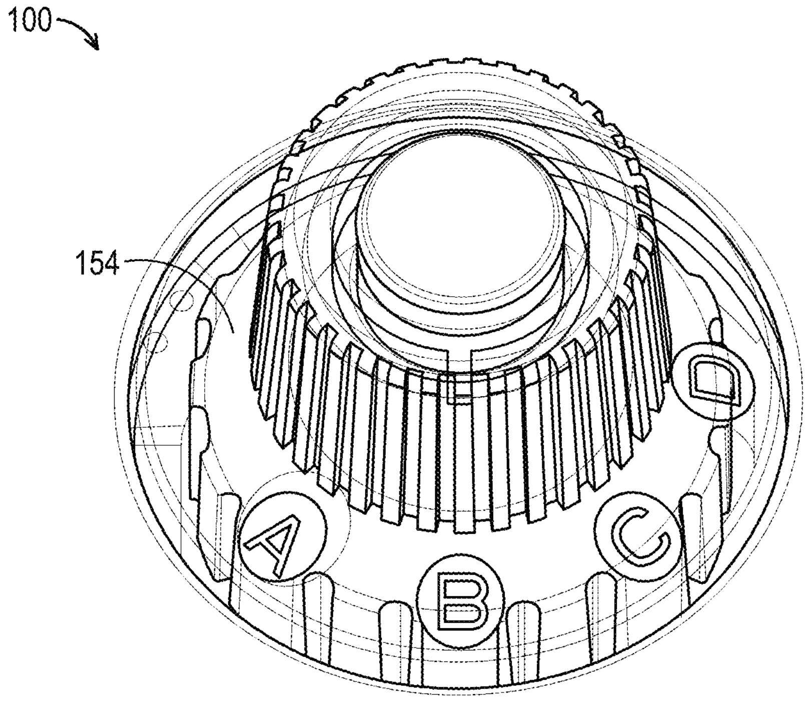
FIG. 14 is an isometric view of a connection mode selection dial of the guitar videogame controller of FIGS. 1 and 2.

As shown in FIG. 13, in some examples, guitar videogame controller 100 comprises a dongle compartment 152 that is configured to receive and house dongle 150 when not in use. For example, mounting plate 130 may comprise dongle compartment 152. In some examples, guitar videogame controller 100 may further comprise any suitable electronic wire connector (e.g., a USB-C connector 101) that is configured to operatively connect guitar videogame controller 100 and the videogame console. As shown in FIG. 14, guitar videogame controller 100 may include an operation mode selection dial 154 that is configured to permit the user to select a connection mode for connecting guitar videogame controller 100 to the videogame console, e.g., using dongle 150 or the wired connector.

B. Selected Embodiments and Claim Concepts

This section describes additional aspects and features of guitar videogame controllers, presented without limitation as a series of paragraphs, some or all of which may be alphanumerically designated for clarity and efficiency. Each of these paragraphs can be combined with one or more other paragraphs, and/or with disclosure from elsewhere in this application, including any attached Appendices and materials listed in the Cross-References, in any suitable manner. Some of the paragraphs below may expressly refer to and further limit other paragraphs, providing without limitation examples of some of the suitable combinations.

A0. A guitar videogame controller, comprising:

a housing including a housing body, an elongate neck extending outward from the housing body, and a fretboard disposed on the elongate neck;

a hall effect button operatively coupled to the housing and configured to be selectively moved relative to the housing to actuate the hall effect button, wherein the hall effect button includes a magnet;

a hall effect sensor fixed relative to the housing, wherein the hall effect sensor is configured to detect a magnitude of a magnetic field of the magnet at the hall effect sensor and to generate an output signal indicating the magnitude of the magnetic field; and a controller including processing logic configured to register when the hall effect button is actuated based on the output signal and to output one or more control signals to a videogame console indicating actuation of the hall effect button.

A1. The guitar videogame controller of paragraph A0, wherein the controller is configured to register actuation of the hall effect button in response to the output signal indicating the magnitude of the magnetic field exceeds a threshold level.

A1.1. The guitar videogame controller of paragraph A1, wherein the threshold level is selected from a plurality of preset discrete value threshold levels stored in a memory of the controller.

A1.2. The guitar videogame controller of paragraph A1.1, wherein each of the plurality of preset discrete value threshold levels corresponds to a respective actuation distance that hall effect button is required to be moved in order for the controller to register actuation of the hall effect button.

A1.3. The guitar videogame controller of paragraph A1.2, wherein the respective actuation distance is a degree of rotation of the hall effect button.

A1.4. The guitar videogame controller of paragraph A1.2, wherein the respective actuation distance is a linear distance the hall effect button is required to be translated from an unactuated position in order for the controller to register actuation of the hall effect button.

A2. The guitar videogame controller of any one of paragraphs A0-A1.4, wherein when the hall effect button is moved relative to the housing to actuate the hall effect button, the magnet is moved relative to the hall effect sensor, such that the magnitude of the magnetic field detected by the hall effect sensor varies as the hall effect button is moved.

A3. The guitar videogame controller of any one of paragraphs A0-A2, wherein the hall effect button comprises a strum bar operatively coupled to the housing body and configured to be selectively rotated relative to the housing body about a strum-bar axis of rotation to actuate the strum bar.

A3.1. The guitar videogame controller of paragraph A3, wherein the strum bar is operatively coupled to the housing body by a pair of strum-bar revolute joints configured to permit selective rotation of the strum bar relative to the housing body about the strum-bar axis of rotation.

A3.2. The guitar videogame controller of paragraph A3.1, wherein each of the strum-bar revolute joints is formed by a respective strum-bar post of the strum bar operatively received within a respective strum-bar bearing fixed relative to the housing body.

A3.3. The guitar videogame controller of any one of paragraphs A3-A3.2, wherein the strum-bar axis of rotation is substantially parallel to a longitudinal axis of the guitar videogame controller.

A3.4. The guitar videogame controller of any one of paragraphs A3-A3.3, wherein the housing body further includes a mounting plate and the strum bar is operatively coupled to the mounting plate.

A3.5. The guitar videogame controller of any one of paragraphs A3-A3.4, wherein rotating the strum bar rotates the magnet relative to the hall effect sensor, such that the magnitude of the magnetic field detected by the hall effect sensor varies as the strum bar is rotated.

A3.6. The guitar videogame controller of any one of paragraphs A3-A3.5, further comprising a strum-bar spring operatively coupled to the strum bar and the housing body, wherein the strum-bar spring is configured to permit the strum bar to be rotated to actuate the strum bar and is configured to automatically return the strum bar to a strum-bar unactuated position after the strum bar is released.

A4. The guitar videogame controller of any one paragraphs A0-A3.6, wherein the hall effect button comprises a whammy bar operatively coupled to the housing body and configured to be selectively rotated relative to the housing body about a whammy-bar axis of rotation to actuate the whammy bar.

A4.1. The guitar videogame controller of paragraph A4, wherein the whammy bar is operatively coupled to the housing body by a pair of whammy-bar revolute joints, such that the whammy bar is configured to be selectively rotated relative to the housing body about the whammy-bar axis of rotation.

A4.2. The guitar videogame controller of paragraph A4.1, wherein each of the whammy-bar revolute joints is formed by a respective whammy-bar post of the whammy-bar operatively received within a respective whammy-bar bearing fixed to the housing body.

A4.3. The guitar videogame controller of any one of paragraphs A4-A4.2, wherein the whammy-bar axis of rotation is transverse to a/the longitudinal axis of the guitar videogame controller.

A4.4. The guitar videogame controller of any one of paragraphs A4-A4.3, wherein the housing body further includes a/the mounting plate, wherein the whammy bar is operatively coupled to the mounting plate.

A4.5. The guitar videogame controller of any one of paragraphs A4-A4.4, wherein rotating the whammy bar rotates the magnet relative to the hall effect sensor, such that the magnitude of the magnetic field varies as the whammy bar is rotated.

A4.6. The guitar videogame controller of any one of paragraphs A4-A4.5, further comprising a whammy-bar spring operatively coupled to the whammy bar and the housing body, wherein the whammy-bar spring is configured to permit the whammy bar to be rotated to actuate the whammy bar and is configured to automatically return the whammy bar to a whammy-bar unactuated position after the whammy bar is released.

A5. The guitar videogame controller of any one of paragraphs A0-A4.6, wherein the hall effect button comprises a fret button operatively coupled to the fretboard.

A5.1. The guitar videogame controller of paragraph A5, wherein the fret button comprises a push button configured to be pushed downward to actuate the fret button.

A5.2. The guitar videogame controller of paragraph A5 or A5.1, further comprising a compressible substrate disposed beneath the fret button, wherein the compressible substrate is configured to permit the fret button to be actuated by pushing the fret button downward and is configured to automatically return the fret button to an unactuated position after the fret button is released.

A5.3. The guitar videogame controller of paragraph A5 or A5.1, further comprising a spring disposed beneath the fret button, wherein the spring is configured to permit the fret button to be actuated by pushing the fret button downward and is configured to automatically return the fret button to an unactuated position after the fret button is released.

A5.4. The guitar videogame controller of any one of paragraphs A5-A5.3, further comprising a plurality of the fret buttons.

A5.5. The guitar videogame controller of any one of paragraphs A5-A5.4, wherein pushing the fret button downward to actuate the fret button moves the magnet relative to the hall effect sensor, such that the magnitude of the magnetic field detected by the hall effect sensor varies as the fret button is actuated.

A6. The guitar videogame controller of any one of paragraphs A0-A5.5, further comprising a plurality of the hall effect buttons including a/the strum bar, a/the whammy bar, and/or a/the fret button(s).

A7. The guitar videogame controller of any one of paragraphs A0-A6, wherein the output signal generated by the hall effect sensor comprises a pulse-width modulation signal.

A7.1. The guitar videogame controller of paragraph A7, wherein an amplitude of the pulse-width modulation signal indicates the magnitude of the magnetic field.

A7.2. The guitar videogame controller of paragraph A7 or A7.1, wherein a duty cycle of the pulse-width modulation signal indicates the magnitude of the magnetic field.

A8. The guitar videogame controller of any one of paragraphs A0-A7.2, wherein the output signal generated by the hall effect sensor comprises an analog signal indicating the magnitude of the magnetic field.

A8.1. The guitar videogame controller of paragraph A8, further comprising an analog to digital converter configured to convert the analog signal generated by the hall effect sensor into a corresponding digital signal and transmit the corresponding digital signal to the controller.

A9. The guitar videogame controller of any one of paragraphs A0-A8.1, further comprising one or more printed circuit boards (PCBs), wherein the hall effect sensor and the controller are operatively mounted on the one or more printed circuit boards.

A10. The guitar videogame controller of any one of paragraphs A0-A9, further comprising a 2.4 GHz enabling dongle configured to operatively connect to the videogame console and permit wireless communication between the guitar videogame controller and the videogame console.

A10.1. The guitar videogame controller of paragraph A10, further comprising a 2.4 GHz wireless transmitter and/or receiver supported by the housing and configured to wirelessly connect to the 2.4 GHz enabling dongle to receive and/or transmit signals to the videogame console.

A11. The guitar videogame controller of any one of paragraphs A0-A10.1, further comprising a plurality of digital buttons.

A11.1. The guitar videogame controller of paragraph A11, wherein the plurality of digital buttons include a directional pad.

A12. The guitar videogame controller of any one of paragraphs A0-A11.1, further comprising one or more analog buttons.

A12.1. The guitar videogame controller of paragraph A12, wherein the one or more analog buttons include an analog stick.

A12.2. The guitar videogame controller of paragraph A12 or A12.1, wherein the one or more analog buttons include an analog touchpad.

A13. The guitar videogame controller of any one of paragraphs A0-A12.2, further comprising a haptic feedback unit configured to generate haptic feedback in response to a user actuating one or more buttons of the guitar videogame controller.

A13.1. The guitar videogame controller of paragraph A13, wherein the one or more buttons include the hall effect button.

A13.2. The guitar videogame controller of paragraph A13 or A13.1, wherein the haptic feedback unit is configured to selectively vibrate in response to the user actuating the one or more buttons.

A14. The guitar videogame controller of any one of paragraphs A0-A13.2, wherein the hall effect sensor is configured to detect the magnitude of a perpendicular component of the magnetic field perpendicular to a sensing surface of the hall effect sensor.

A15. The guitar videogame controller of any one of paragraphs A0-A14, wherein the output signal is proportional to the magnitude of the magnetic field.

A16. The guitar videogame controller of any one of paragraphs A0-A15, wherein the output signal generated by the hall effect sensor is a digital signal, and wherein the hall effect sensor is configured to generate the output signal in response to the magnitude of the magnetic field exceeding a threshold magnitude.

A17. The guitar videogame controller of any one of paragraphs A0-A16, wherein the hall effect button includes a button body and the magnet is operatively coupled to the button body via a snap-fit arrangement, by embedding the magnet within the button body, and/or using adhesives.

A18. The guitar videogame controller of any one of paragraphs A0-A17, wherein the housing body includes a/the mounting plate, and wherein the hall effect button is operatively coupled to the mounting plate.

A19. The guitar videogame controller of any one of paragraphs A0-A18, wherein the hall effect button is configured to be selectively rotated relative to the housing to actuate the hall effect button.

A20. The guitar videogame controller of any one of paragraphs A0-A19, wherein the hall effect button is configured to be translated linearly to actuate the hall effect button.

B0. A guitar videogame controller, comprising:

a housing including a housing body, an elongate neck extending outward from the housing body, and a fretboard disposed on the elongate neck;

a hall effect button supported by the housing, the hall effect button including:

a button body configured to be selectively moved relative to the housing to actuate the hall effect button;

a magnet operatively coupled to the button body, such that the magnet is configured to be selectively moved relative to the housing with the button body; and a hall effect sensor fixed relative to the housing, wherein the hall effect sensor is configured to detect a component of a magnetic field of the magnet and to generate an output signal indicating a magnitude of the component of the magnetic field; and a controller including processing logic configured to register actuation of the hall effect button based on the output signal, wherein the processing logic is configured to output one or more control signals to a videogame console indicating actuation of the hall effect button in response to registering actuation of the hall effect button.

B1. The guitar videogame controller of paragraph BO, further comprising the features and/or components of any one of paragraphs A1-A20.

C0. A hall effect button for a guitar videogame controller, the hall effect button comprising:

a button body operatively coupled to a housing of the guitar videogame controller, such that the button body is configured to be selectively moved relative to the housing to actuate the hall effect button;

a magnet operatively coupled to the button body, wherein the magnet is configured to be selectively moved relative to the housing with the button body; and a hall effect sensor fixed relative to the housing, wherein the hall effect sensor is configured to detect a component of a magnetic field of the magnet and to output an output signal to a controller of the guitar videogame controller, wherein the output signal indicates a magnitude of the component of the magnetic field; and wherein the controller includes processing logic configured to register when the hall effect button is actuated based on the output signal, wherein the processing logic is configured to output one or more control signals to a videogame console indicating actuation of the hall effect button in response to registering actuation of the hall effect button.

C1. The guitar videogame controller of paragraph CO, further comprising the features and/or components of any one of paragraphs A1-A20.

Advantages, Features, and Benefits

The different embodiments and examples of the guitar videogame controllers described herein provide several advantages over known solutions. For example, illustrative embodiments and examples described herein allow a guitar videogame controller including one or more hall effect buttons and/or actuators each having a user adjustable trigger point. The hall effect buttons are configured to permit the user to adjust the extent to which the hall effect button is required to be moved or actuated (e.g., rotated or linearly translated) in order for the guitar videogame controller to register actuation of the button and transmit corresponding control systems to a videogame console.

Additionally, and among other benefits, illustrative embodiments and examples described herein allow a control system that is configured to determine, based on an analog voltage signal and/or pulse-width modulation (PWM) signal output by the hall effect sensor of a hall effect button, one or more corresponding control signals to transmit to a videogame console. The control system may be configured to determine whether the hall effect button has been actuated or not based on the information detected by the hall effect sensor and communicate this information to the videogame console.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A guitar videogame controller, comprising:

a housing including a housing body, an elongate neck extending outward from the housing body, and a fretboard disposed on the elongate neck;

a hall-effect strum bar operatively coupled to the housing and configured to be selectively rotated relative to the housing about a strum-bar axis of rotation to actuate the hall-effect strum bar, wherein the hall-effect strum bar includes a magnet;

a hall effect sensor fixed relative to the housing, wherein the hall effect sensor is configured to detect a magnitude of a magnetic field of the magnet at the hall effect sensor and to generate an output signal indicating the magnitude of the magnetic field; and a controller including processing logic configured to register when the hall-effect strum bar is actuated based on the output signal and to output one or more control signals to a videogame console indicating actuation of the hall-effect strum bar.

2. The guitar videogame controller of claim 1, wherein the controller is configured to register actuation of the hall-effect strum bar in response to the output signal indicating the magnitude of the magnetic field exceeds a threshold level.

3. The guitar videogame controller of claim 2, wherein the threshold level is selected from a plurality of preset discrete value threshold levels stored in a memory of the controller, wherein each of the plurality of preset discrete value threshold levels corresponds to a respective actuation distance that the hall-effect strum bar is required to be rotated in order for the controller to register actuation of the hall-effect strum bar.

4. The guitar videogame controller of claim 1, wherein rotating the hall-effect strum bar rotates the magnet relative to the hall effect sensor, such that the magnitude of the magnetic field detected by the hall effect sensor varies as the hall-effect strum bar is rotated.

5. The guitar videogame controller of claim 1, further comprising a hall-effect whammy bar operatively coupled to the housing body and configured to be selectively rotated relative to the housing body about a whammy-bar axis of rotation to actuate the hall-effect whammy bar.

6. The guitar videogame controller of claim 5, wherein rotating the hall-effect whammy bar rotates a whammy-bar magnet relative to a whammy-bar hall effect sensor, such that a magnitude of a magnetic field detected by the whammy-bar hall effect sensor varies as the hall-effect whammy bar is rotated.

7. The guitar videogame controller of claim 1, further comprising a hall-effect fret button operatively coupled to the fretboard.

8. The guitar videogame controller of claim 7, wherein the hall-effect fret button comprises a push button configured to be pushed downward to actuate the hall-effect fret button.

9. The guitar videogame controller of claim 8, wherein pushing the hall-effect fret button downward to actuate the hall-effect fret button moves a fret-button magnet relative to a fret-button hall effect sensor, such that a magnitude of a magnetic field detected by the fret-button hall effect sensor varies as the hall-effect fret button is pushed downward.

10. The guitar videogame controller of claim 1, further comprising a plurality of hall effect buttons including the hall-effect strum bar, a hall-effect whammy bar, and one or more hall-effect fret buttons.

11. The guitar videogame controller of claim 1, wherein the hall effect sensor is configured to generate the output signal using pulse-width modulation.

12. The guitar videogame controller of claim 1, wherein the hall effect sensor includes an analog signal generator configured to generate the output signal.

13. A guitar videogame controller, comprising:

a housing including a housing body, an elongate neck extending outward from the housing body, and a fretboard disposed on the elongate neck;

a hall-effect strum bar supported by the housing, the hall-effect strum bar including:

a button body configured to be selectively rotated relative to the housing about a strum-bar axis of rotation to actuate the hall-effect strum bar;

a magnet operatively coupled to the button body, such that the magnet is configured to be selectively rotated relative to the housing with the button body; and a hall effect sensor fixed relative to the housing, wherein the hall effect sensor is configured to detect a component of a magnetic field of the magnet and to generate an output signal indicating a magnitude of the component of the magnetic field; and a controller including processing logic configured to register actuation of the hall-effect strum bar based on the output signal, wherein the processing logic is configured to output one or more control signals to a videogame console indicating actuation of the hall-effect strum bar in response to registering actuation of the hall-effect strum bar.

14. The guitar videogame controller of claim 13, wherein the controller is configured to register actuation of the hall-effect strum bar in response to the output signal indicating the magnitude of the component of the magnetic field exceeds a threshold level.

15. The guitar videogame controller of claim 14, wherein the threshold level is selected from a plurality of preset discrete value threshold levels stored in a memory of the controller, wherein each of the plurality of preset discrete value threshold levels corresponds to a respective actuation distance that the button body is required to be rotated in order for the controller to register actuation of the hall-effect strum bar.

16. The guitar videogame controller of claim 13, further comprising a hall-effect whammy bar, wherein the hall-effect whammy bar is configured to be selectively rotated relative to the housing body about a whammy-bar axis of rotation to actuate the hall-effect whammy bar.

17. The guitar videogame controller of claim 13, further comprising a hall-effect fret button operatively coupled to the fretboard, wherein the hall-effect fret button is configured to be selectively pushed downward relative to the fretboard to actuate the hall-effect fret button.

18. The guitar videogame controller of claim 13, further comprising a plurality of hall effect buttons including the hall-effect strum bar supported by the housing body, a hall-effect whammy bar supported by the housing body, and one or more hall-effect fret buttons supported by the fretboard.

* * * * *